US012255508B2

United States Patent
Kim

(10) Patent No.: US 12,255,508 B2
(45) Date of Patent: Mar. 18, 2025

(54) AXIAL GAP TYPE MOTOR AND WATER PUMP USING SAME

(71) Applicant: AMOTECH CO., LTD., Incheon (KR)

(72) Inventor: Byung Soo Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 165 days.

(21) Appl. No.: 17/798,459

(22) PCT Filed: Feb. 9, 2021

(86) PCT No.: PCT/KR2021/001688
§ 371 (c)(1),
(2) Date: Aug. 9, 2022

(87) PCT Pub. No.: WO2021/172793
PCT Pub. Date: Sep. 2, 2021

(65) Prior Publication Data
US 2023/0077214 A1 Mar. 9, 2023

(30) Foreign Application Priority Data

Feb. 26, 2020 (KR) .................. 10-2020-0023713
Mar. 27, 2020 (KR) .................. 10-2020-0037751
(Continued)

(51) Int. Cl.
*H02K 21/24* (2006.01)
*F04D 13/06* (2006.01)
(Continued)

(52) U.S. Cl.
CPC ......... *H02K 21/24* (2013.01); *F04D 13/0606* (2013.01); *F04D 29/406* (2013.01);
(Continued)

(58) Field of Classification Search
CPC ... F04D 13/0606; F04D 29/406; H02K 21/24; H02K 11/33; H02K 1/02; H02K 5/1675; H02K 7/085; H02K 2211/03
See application file for complete search history.

(56) References Cited

U.S. PATENT DOCUMENTS

2008/0118380 A1\* 5/2008 Nakanishi ........... F04D 29/5813
417/423.1
2010/0158724 A1\* 6/2010 Ihle ........................ H02K 3/522
310/86
(Continued)

FOREIGN PATENT DOCUMENTS

JP 2004343876 12/2004
JP 2011196341 10/2011
(Continued)

OTHER PUBLICATIONS

English Description of JP-2011196341 A obtained Apr. 2, 2024 (Year: 2011).\*
(Continued)

*Primary Examiner* — Connor J Tremarche
(74) *Attorney, Agent, or Firm* — CANTOR COLBURN LLP

(57) ABSTRACT

Provided is an axial gap type motor employing a non-rare earth magnet, and a water pump using same. The axial gap type motor for a water pump (EWP) comprises: a rotor rotatably supported on a fluid flow passage between a pump cover and a body case; a stator arranged in a lower space formed by the body case and an upper cover, so as to generate a rotating magnetic field, thereby rotating the rotor; and a partition arranged on the body case in order to separate the rotor from the stator. The rotor can use a ferrite magnet, which is a non-rare earth magnet.

9 Claims, 30 Drawing Sheets

(30) Foreign Application Priority Data

| Mar. 27, 2020 | (KR) | .................. 10-2020-0037752 |
| Mar. 27, 2020 | (KR) | .................. 10-2020-0037753 |
| Mar. 27, 2020 | (KR) | .................. 10-2020-0037754 |
| Jun. 4, 2020 | (KR) | .................. 10-2020-0067498 |

(51) Int. Cl.
  *F04D 29/40* (2006.01)
  *H02K 1/02* (2006.01)
  *H02K 5/167* (2006.01)
  *H02K 7/08* (2006.01)
  *H02K 11/33* (2016.01)

(52) U.S. Cl.
  CPC ............. *H02K 1/02* (2013.01); *H02K 5/1675* (2013.01); *H02K 7/085* (2013.01); *H02K 11/33* (2016.01); *H02K 2211/03* (2013.01)

(56) References Cited

U.S. PATENT DOCUMENTS

2012/0262022 A1* 10/2012 Takemoto ............ H02K 1/2796
                                                  310/156.35
2014/0103777 A1* 4/2014 Santos ................ H02K 15/022
                                                  310/254.1

FOREIGN PATENT DOCUMENTS

| JP | 2011196341 A | * | 10/2011 | |
| JP | 2012182957 | | 9/2012 | |
| JP | 2012193650 | | 10/2012 | |
| JP | 2013155649 | | 8/2013 | |
| KR | 100900120 | | 6/2009 | |
| KR | 20120096472 | | 8/2012 | |
| KR | 20130135664 | | 12/2013 | |
| KR | 20130135664 A | * | 12/2013 | |
| KR | 20140010562 | | 1/2014 | |
| WO | 2011119574 | | 9/2011 | |
| WO | WO-2013114921 A1 | * | 8/2013 | ........... F04D 13/064 |

OTHER PUBLICATIONS

English Description of KR-20130135664-A obtained Apr. 2, 2024 (Year: 2013).*

WO 2013/114921 A1, Enomoto, with English Description. (Year: 2013).*

International Search Report—PCT/KR2021/001688 dated May 14, 2021.

* cited by examiner

AXIAL GAP TYPE MOTOR AND WATER PUMP USING SAME

TECHNICAL FIELD

The present invention relates to an axial gap type motor, and more particularly, to an axial gap type motor employing a non-rare earth magnet and an electric water pump using the same.

BACKGROUND ART

Generally, a water pump applied to a vehicle is a device for circulating cooling water. The water pump is forcibly driven by a belt to suck and discharge cooling water by rotating a pump impeller, thereby circulating cooling water. An engine-driven water pump or an electric water pump is representatively used in the inside of the water pump. The engine-driven water pump is assembled with a seal unit to prevent leakage of cooling water, and the electric water pump drives an electric motor by electricity provided by a battery or the like, and circulates cooling water by rotating an impeller by the electric motor to suck and discharge the cooling water.

In addition, since the electric water pump does not require the engine driving force of the vehicle compared to the engine-driven water pump, the engine efficiency is increased compared to the engine-driven water pump, and thus fuel efficiency is improved, and furthermore, the temperature of the cooling water may be precisely controlled, thereby being widely applied to various kinds of vehicles.

In addition, in the case of an electric vehicle, a hybrid vehicle, or a fuel cell vehicle, the importance of the electric water pump grows increasingly as compared with the engine-driven water pump because driving of a vehicle is executed even at a state where driving of an engine stops (in the case of a hybrid vehicle), or even an engine for driving the water pump is not provided (in the case of an electric vehicle or a fuel cell vehicle).

Meanwhile, among the electric water pumps, a canned type electric water pump is a pump driven by an electric motor having a can-shaped sealing container inside a stator. The canned type electric water pump has a structure in which a can structure is inserted between a rotor and a stator, and a hydraulic unit is extended to the rotor so that the rotor is immersed in the cooling water, thereby properly cooling, through the cooling water contacting the rotor, the frictional heat generated from the rotor.

Korean Patent Registration Publication No. 10-0900120 (Patent Document 1) proposes a pump including: a pump unit having an impeller for suction and discharging liquid; a motor unit driving the pump unit; a casing containing the pump unit embedded therein; a partition plate separating the motor unit from the pump unit; and a mold resin integrally molded with the motor unit to protect the motor unit.

The conventional pump structure of Patent Document 1 has a structure in which a magnet and a state core are positioned in a radial direction and water is introduced into the magnet, and needs a structure in which water should not be introduced into the stator (core winding part), and thus has a waterproof structure using a waterproof can or an injection mold. As a result, an air gap between the rotor and the stator core is increased, and a large amount of magnetic flux loss is generated, and thus it is difficult to meet a desired pump (motor) capacity with a general magnet, so expensive rare earth magnets are generally used.

In general, electric water pumps (EWPs), compressors, oil pumps, etc., employ inner rotor-type electric motors, but in the case of inner rotor-type motors, the cross-sectional area of magnets (i.e., effective area) is small, and thus, performance is implemented while using rare earths, to thereby increase production costs.

In addition, the water pump motor employs an inner rotor-type motor, and the rare earth magnet (Nd—Fe—B) employed in the rotor contains iron components, and thus, rust may be generated in the magnet when contacting water, so the rotor part also adopts a waterproof structure. Accordingly, the water pump motor has a structure in which an air gap between the rotor and the stator is increased, thereby increasing the amount of Nd used in the rotor magnet.

Moreover, in the inner rotor-type motor, the inner shoe portion of the core of the stator facing the magnet of the rotor is not generally rounded or R-processed, and thus the back-electromotive force (back-EMF) waveform may not be made into a sine curve, causing noise and vibration problems. That is, in general, the inside of the core is designed to form a concentric circle with respect to the center. Accordingly, the core structure of the conventional stator separately needs an auxiliary component or to be designed for improving noise and vibration problems.

In order to improve the generation of vibration and noise, conventionally, it is generally performed in a form in which a round (R) processing is applied to the magnet of the rotor. However, if the magnet is a segment structure, there is no problem, but if the magnet is an integral structure in which the magnet is divided and magnetized, it is difficult to perform a rounding process to obtain a round (R) shape.

Meanwhile, a conventional water pump motor has a problem that a separate component should be added in order to obtain an electromagnetic compatibility (EMC) improvement effect and an electromagnetic interference (EMI) improvement effect by grounding between a core of a stator and a printed circuit board (PCB) on which a motor driving circuit is mounted.

In general, a roof fan ventilation device is installed on a roof of a building such as a house, a factory, a vinyl house, a piggery or cowshed/livestock shed, etc. to forcibly discharge indoor air to the outside or suck outdoor air from the outside, thereby ventilating outdoor air and controlling humidity together with maintaining the room at a proper temperature.

A roof fan including a small impeller and an electric motor is manufactured to be small and thus, performs high-speed rotation, and thus, as a revolution per minute (RPM) is increased, vibration and noise may be generated.

In consideration of this, in other related art, a roof fan ventilation device in which vibration and noise are significantly reduced and a ventilation force is significantly improved by reducing a revolution per minute (RPM) by making a roof fan larger than an existing fan (for example, a roof fan diameter of about 3 m) is proposed. The roof fan ventilation device has fan blades and a driving motor which are separately installed and transmits power between the driving motor and the fan blades by using a belt-pulley type power transmission means.

In addition, most conventional roof fans have a somewhat complicated structure, and thus, it is not easy to manufacture the most conventional roof fans, and durability is reduced due to weak structural strength.

In general, the roof fan ventilation device includes an impeller forming a fan, a motor driving the impeller, and a housing for installing the impeller and the motor on a roof.

The impeller may be driven directly by an electric motor or may be driven using a belt-pulley type power transmission means.

In the conventional roof fan ventilation devices, vibration and noise are simply recognized as problems caused by the size and RPM of the roof fan, and are not recognized as problems caused by the structural problem of the electric motor itself. As an electric motor used to drive a roof fan, an outer rotor-type fan motor which may be compact for a radial direction and an axial direction is widely adopted in consideration of an installation space thereof.

A conventional outer rotor-type fan motor is a radial gap type motor, and largely includes a motor unit and a fan unit rotating outside the motor unit by rotation of a rotation shaft of the motor unit.

The back-EMF is the voltage induced in the stator coil by the magnet which is magnetized, and the higher the rotation speed is and the stronger the magnet is used, the higher the voltage is induced. In the case of a BLDC motor using a permanent magnet motor, the back-EMF appears in a trapezoidal shape as shown in FIG. 7A.

Moreover, roof fans for vehicles are required to minimize noise and vibration to improve the quality of the vehicle and to make indoor passengers comfortable, even with low levels of noise/vibration.

DISCLOSURE

Technical Problem

The present invention has been made in view of such a conventional problem, and an object of the present invention is to provide an axial gap type motor having equivalent magnetic energy to a motor using a rare earth magnet even when a ferrite magnet which is a non-rare earth magnet is used by allowing an air gap to be reduced by separating between a rotor and a stator by means of a thin-plate partition, and a water pump using the axial gap type motor.

Another object of the present invention is to provide an axial gap type motor which is designed for waterproofing with a simple structure and capable of fully waterproofing, and a water pump using the same.

Another object of the present invention is to provide an axial gap type motor in which a core shape is optimized to minimize core loss generated in the motor by applying soft magnetic composites (SMC), not a general electric steel sheet (S-60), to a stator core (teeth) of a longitudinal-axis motor, and a water pump using the same.

Another object of the present invention is to provide an axial gap type motor capable of improving noise and vibration generation by forming a round (R) shape as a core (teeth) shape to obtain a back electromotive force (back-EMF) waveform as a sine curve shape, by manufacturing the teeth of a stator core by means of a compression molding method using soft magnetic composites (SMC) powder, and a water pump using the same.

Another object of the present invention is to provide an axial gap type motor in which a back yoke connected to teeth (i.e., a coil winding part) is bonded to a body case to dissipate heat, and the back yoke is used as a radiator of a printed circuit board (PCB) to optimize heat generation, and a water pump using the same.

Another object of the present invention is to provide an axial gap type motor capable of improving electromagnetic compatibility (EMC) and electromagnetic interference (EMI) by simply connecting between a back yoke and a PCB to the ground (GND) by putting a pin in the back yoke, and a water pump using the same.

Another object of the present invention is to provide a radial gap type motor capable of improving noise and vibration generation and a roof fan of a vehicle using the same by forming a round (R) shape on a shoe portion shape of a core to obtain a back electromotive force (back-EMF) waveform as a sine curve shape when a stator core is manufactured by a blanking method of an electric steel sheet (S-60).

Technical Solution

According to an embodiment of the present invention, there is provided an axial gap type motor for an electric water pump (EWP) including: a rotor rotatably supported on a fluid flow passage between a pump cover and a body case; a stator arranged in a lower space formed by the body case and an upper cover, and generating a rotating magnetic field to rotatably drive the rotor; and a partition arranged on top of the body case to separate between the rotor and the stator, wherein the rotor includes a non-rare earth magnet.

The rotor may include a plurality of magnets which are annularly arranged, and a back yoke installed on the rear surfaces of the magnets to form a magnetic circuit, wherein the rotor may be integrally formed at a lower side of the impeller and may be rotatably supported by a support shaft supported at one end on the partition.

In this case, the partition may serve as an air gap between the rotor and the stator.

In addition, the axial gap type motor for an electric water pump (EWP) according to an embodiment of the present invention may further include a sleeve bearing coupled to an outer periphery of the support shaft to rotatably support the rotor, and a bearing housing integrally formed on a lower plate of the impeller to accommodate the sleeve bearing therein.

The stator may include: a stator core including a plurality of teeth and a back yoke interconnected with the plurality of teeth to form a magnetic circuit; a plurality of bobbins integrally formed to surround an outer peripheral surface to which coils of each of the plurality of teeth are wound; and coils wound on an outer peripheral surface of the bobbins, wherein each of the plurality of teeth may be formed in a "T" shape, and formed of soft magnetic composites (SMC) powder, and the back yoke may be formed by stacking a plurality of electric steel sheets.

Further, each of the plurality of teeth includes a coil winding part on which the coil is wound and a shoe with a flange extending from the coil winding part, and an edge between a side surface and a front end surface of the shoe and the front end surface of the shoe may be round (R) processed. As a result, the axial gap type motor of the present invention may obtain a back electromotive force (back-EMF) waveform in the form of a sine curve, thereby improving noise and vibration generation.

Moreover, the coil winding part may be formed of a triangular pillar, and the shoe may have a trapezoidal cross section.

The stator core may include the plurality of teeth annularly arranged on the same circumference in parallel with the axial direction to face the magnet of the rotor, and the back yoke connected to the plurality of teeth at a right angle to form a magnetic circuit.

In this case, each of the plurality of teeth may be press-fitted and coupled to an assembly hole or an assembly recess of the back yoke.

The stator may include a stator core on which the plurality of teeth are annularly arranged on the same circumference in parallel to the axial direction to face the magnet of the rotor, and the plurality of teeth are connected to the back yoke at a right angle to form a magnetic circuit.

According to an embodiment of the present invention, there is provided a water pump including: a pump cover having an inlet through which a fluid is introduced and an outlet through which the introduced fluid is discharged, at one side and the other side thereof, respectively; a body case coupled to the pump cover to form a fluid flow passage inside the pump cover and having a lower space; an upper cover coupled to a lower end of the body case to set the lower space as a sealing state; a rotor rotatably supported on the fluid flow passage; an impeller integrally formed on an upper side of the rotor; a stator arranged in the lower space to generate a rotating magnetic field to rotatably drive the rotor; and a partition arranged on an upper portion of the body case to separate between the rotor and the stator, wherein the rotor and the stator form an axial gap type motor.

In addition, according to an embodiment of the present invention, there is provided a water pump including: a pump housing having a lower space in a sealing state on one side thereof, in which, on the other side thereof, an inlet through which a fluid is introduced and an outlet through which the introduced fluid is discharged are connected through a fluid flow passage; a rotor rotatably supported on the fluid flow passage; an impeller integrally formed on an upper side of the rotor; a stator arranged in the lower space to generate a rotating magnetic field to rotatably drive the rotor; a partition arranged inside the pump housing to separate between the rotor and the stator; and a support shaft having one end supported by the partition and rotatably supporting the rotor, wherein the rotor and the stator may form an axial gap type motor, and the rotor may include a non-rare earth magnet.

The stator includes a stator core having a plurality of teeth each on which a coil is wound and a back yoke connected to the teeth at a right angle to form a magnetic circuit, and each of the plurality of teeth may be made of soft magnetic composites (SMC) powder, and the back yoke may be made of an electric steel sheet.

In this case, in each of the plurality of teeth, the shoe facing the rotor has a flange extending from the coil winding portion, and an edge between the side surface of the shoe and the front end surface may be rounded, that is, round (R) processed.

In addition, the rotor may include a ferrite magnet.

Furthermore, the stator may include a stator core on which the plurality of teeth are annularly arranged on the same circumference in parallel to the axial direction to face the magnet of the rotor, and the plurality of teeth are connected to the back yoke at a right angle to form a magnetic circuit, and the teeth may be compression-molded or extruded by using any one of amorphous metal powder, spherical soft magnetic powder, and an alloy powder in which amorphous metal powder and spherical soft magnetic powder are mixed.

The water pump according to an embodiment of the present invention may further include a bearing coupled to an outer periphery of the support shaft to rotatably support the rotor, and a bearing housing integrally formed on a lower plate of the impeller to accommodate the bearing therein.

The water pump according to an embodiment of the present invention may further include a driver with a printed circuit board (PCB) with a motor driving circuit to drive the stator, wherein each of the printed circuit board (PCB) and the back yoke may include a plurality of protrusions with through-holes, on an outer periphery thereof, and may be fixed to a stepped portion of the body case by fastening screws or bolts through the through-holes.

The water pump according to an embodiment of the present invention may further include a driver for driving the stator, wherein the printed circuit board (PCB) forming the driver may be electrically connected to the back yoke through a pin.

Furthermore, the water pump according to an embodiment of the present invention may further include a driver with a printed circuit board (PCB) on which a motor driving circuit is formed to drive the stator, wherein a land part of the printed circuit board (PCB) may be electrically connected to the bottom surface of the back yoke.

According to an embodiment of the present invention, there is provided a water pump including: a pump cover having an inlet through which a fluid is introduced and an outlet through which the introduced fluid is discharged, at one side and the other side thereof; a body case coupled to the pump cover to form a fluid flow passage inside the pump cover and having a lower space; an upper cover coupled to a lower end of the body case to set the lower space as a sealing state; an impeller rotatably supported on the fluid flow passage; a partition arranged on an upper portion of the body case and separating between the fluid flow passage and the lower space; and an axial gap type motor including a rotor rotatably supported in the fluid flow passage and integrally formed on a lower side of the impeller, and a stator arranged in the lower space with the partition wall interposed therebetween to rotatably drive the rotor, wherein the stator has a stator core on which a stator coil is wound, the stator core including: a plurality of teeth each of the front end portions is annularly arranged on the same circumference in parallel with the axial direction; and a back yoke which is connected to the plurality of teeth at a right angle and formed of an annular disk to form a magnetic circuit.

According to an embodiment of the present invention, there is provided a roof fan driving motor including: a rotary shaft; a rotor having an inverted cup shape and including a back yoke to which the rotary shaft is coupled at the central portion and a magnet attached to the inside of the back yoke; a stator for applying a rotating magnetic field to the rotor with an outer periphery facing the magnet of the rotor with an air gap; a bearing bush installed through the central portion of the stator and having a stepped portion in each of the upper and lower portions; and upper and lower bearings installed on the upper and lower stepped portions of the bearing bush to rotatably support the rotary shaft, wherein the stator includes a stator core in which a plurality of teeth are radially extended on an outer circumference of the annular yoke, and each of the plurality of teeth has a round (R) processed shape.

The back yoke includes: a first cylindrical portion with the magnet attached to the inside; a second cylindrical portion bent and extended in two stages from the first cylindrical portion; and an upper plate portion bent in one stage from the upper portion of the second cylindrical portion and having a plurality of through-holes, wherein a cylindrical support portion of the impeller is coupled to the outer periphery of each of the first and second cylindrical portions, and the upper portion of the rotary shaft may be integrally coupled to the rotor by an upper plate of the impeller formed inside and outside the upper plate portion.

Furthermore, the stator includes: a stator core with a plurality of teeth radially extended around the outer periphery of the annular yoke; a bobbin surrounding the outer periphery of the stator core and having a bearing bush inserted into the inner periphery; and a coil wound on the outer periphery of the bobbin surrounding the teeth of the stator core, wherein a cylindrical insert for increasing the verticality of the rotary shaft may be inserted between the bobbin and the bearing bush.

The bobbin further includes upper and lower protrusions extending upward and downward to the front end portion of each tooth to limit a coil winding region where the coil is wound, wherein when the lower protrusion is assembled with the printed circuit board (PCB), the lower protrusion serves to maintain a predetermined interval.

The stator may include three-phase (U, V, W) coils wound around the plurality of teeth, and a start terminal and an end terminal of the three-phase (U, V, W) coils may be electrically connected to a printed circuit board (PCB) on which a motor driving circuit is mounted through six terminal pins.

In this case, the three terminal pins may be commonly connected to the conductive pattern of the printed circuit board (PCB) to form a neutral point.

According to an embodiment of the present invention, there is provided a roof fan including: an impeller; a motor that rotates the impeller; a motor drive circuit that applies a drive signal to the motor; a housing having a ring-shaped outer frame, a motor support portion positioned inside the outer frame and supporting a lower portion of the motor, and a plurality of bridges having both ends connected to the outer frame and the motor support portion, wherein the front end portion of each of the bridges is fixed to a roof fan installation module installed on the ceiling of the vehicle; and a cover coupled to one of the plurality of bridges and the motor support portion to form an air-cooling flow passage portion.

In this case, the motor support portion may include at least one through-hole serving as an outlet for the air-cooling flow passage portion, and the air-cooling wind discharged through the through-hole may air-cool a heating electronic component mounted on the printed circuit board (PCB) having the motor driving circuit implemented.

In addition, the housing includes: a ring-shaped outer frame having an annular groove for accommodating the lower end of the impeller; a circular motor support portion having a lower portion of the bearing bush of the motor coupled to a central through-hole to support the motor; and a plurality of bridges for connecting the outer frame and the motor support portion, wherein the front end portion of each of the bridges may be fixed to the roof fan installation module.

In this case, the bridge and the electric motor support portion of the housing are coupled to the cover to form an air-cooling flow passage portion, a through-hole serving as an inlet of the air-cooling flow passage portion is formed at the front end portion of each bridge, and the motor support portion may include at least one through-hole serving as an outlet for the air-cooling flow passage portion.

Moreover, the cover includes a circular central portion surrounding the motor support portion while forming a space therein, and a flow passage forming portion extending from the central portion to be coupled to one bridge of the housing to form the air-cooling flow passage portion, wherein when the impeller is rotated by the motor, air around the printed circuit board (PCB) is supplied to the impeller, and thus a negative pressure is generated, and air-cooling air flows through the air-cooling flow passage portion may be formed while negative pressure is generated in the motor support portion and the air-cooling flow passage portion arranged to face the printed circuit board (PCB).

The impeller includes: a circular upper plate; a plurality of wings radially extending from an outer circumference at the bottom surface of the circular upper plate; an annular lower plate connecting and supporting the lower portions of the plurality of wings; a cylindrical support portion extending in a cylindrical shape on the inner side of the bottom surface of the circular upper plate and having a lower end portion surrounding a side surface of the back yoke of the rotor; and a shaft support portion surrounding the upper portion of the rotary shaft of the rotor and the upper plate portion of the back yoke, wherein when the shaft support portion is formed, the upper plate portion of the rotary shaft and the upper plate portion of the back yoke may be integrally formed in an insert molding method.

The bearing bush of the motor passes through the printed circuit board (PCB) on which a motor driving circuit is mounted, and is supported on the motor support portion of the housing, the motor is configured such that a lower protrusion of a bobbin formed in a plurality of teeth of the stator is supported at a predetermined distance from a printed circuit board (PCB), and the stator and the printed circuit board (PCB) may be physically fixedly coupled through six terminal pins electrically connecting a start terminal and an end terminal of a three-phase (U, V, W) coil wound on the core of the stator to the motor driving circuit of the printed circuit board (PCB).

Advantageous Effects

As described above, in the axial gap type motor of the present invention, when a longitudinal-axis type motor having the same outer diameter as a general inner-rotor motor is applied, an air gap may be reduced by separating between the rotor and the stator using a partition between the rotor and the stator, and thus, even if a ferrite magnet, which is a non-rare earth magnet, is used, the motor has a magnetic energy equivalent to the case of a motor using a rare earth magnet containing Nd.

According to the present invention, the rotor and the stator are separated by the partition of the body case in which the stator is embedded, and thus the rotor is designed in a simple structure, thereby enabling complete waterproof implementation.

In addition, in the present invention, as the rotor and the stator are separated by using the thin partition, a ferrite magnet which is an inexpensive non-rare earth magnet may be used as a magnet of the rotor.

Moreover, the motor according to the present invention is an axial gap type in which a rotor and a stator face each other with a thin partition therebetween, and may be used in an open structure without a separate magnet waterproof structure such as a rare earth magnet. Accordingly, an air gap may be further reduced compared to a conventional motor employing a rare earth magnet to increase motor efficiency.

In the present invention, the stator core (teeth) of the longitudinal-axis type motor may employ soft magnetic composites (SMC) instead of a general electric steel sheet (S-60) to optimize the shape of the core (teeth) so as to minimize core (i.e., iron) loss generated in the motor.

In addition, in the present invention, by manufacturing a stator core (teeth) by a compression molding method using soft magnetic composites (SMC) powder, a round (R) shape is formed in the core shape to obtain a back electromagnetic force (back-EMF) waveform in a sine curve shape, thereby improving noise and vibration generation.

Moreover, in the present invention, a back yoke connected to a teeth (i.e., a coil winding portion) is bonded to the body case to dissipate heat, and the back yoke is used as a heat sink of a PCB to optimize heat generation.

In the present invention, a pin is erected in the back yoke to easily connect the back yoke and the PCB to ground (GND), thereby improving electromagnetic compatibility (EMC) and electromagnetic interference (EMI).

According to the present invention, when the stator core is manufactured by the blanking method of the electrical steel sheet (S-60), the round (R) shape is formed in the partial shape of the shoe of the core, so that a back-EMF waveform is obtained in the form of a sine curve, thereby improving noise and vibration.

In addition, according to the present invention, an insert is provided between the stator support and the bearing bush to improve the verticality of the rotor rotary shaft, thereby improving noise and vibration.

According to the present invention, the heating electronic component of the motor driving circuit may be cooled by using the air-cooling flow passage formed by the bridge of the housing and the cover.

BEST MODE

Figure 1:
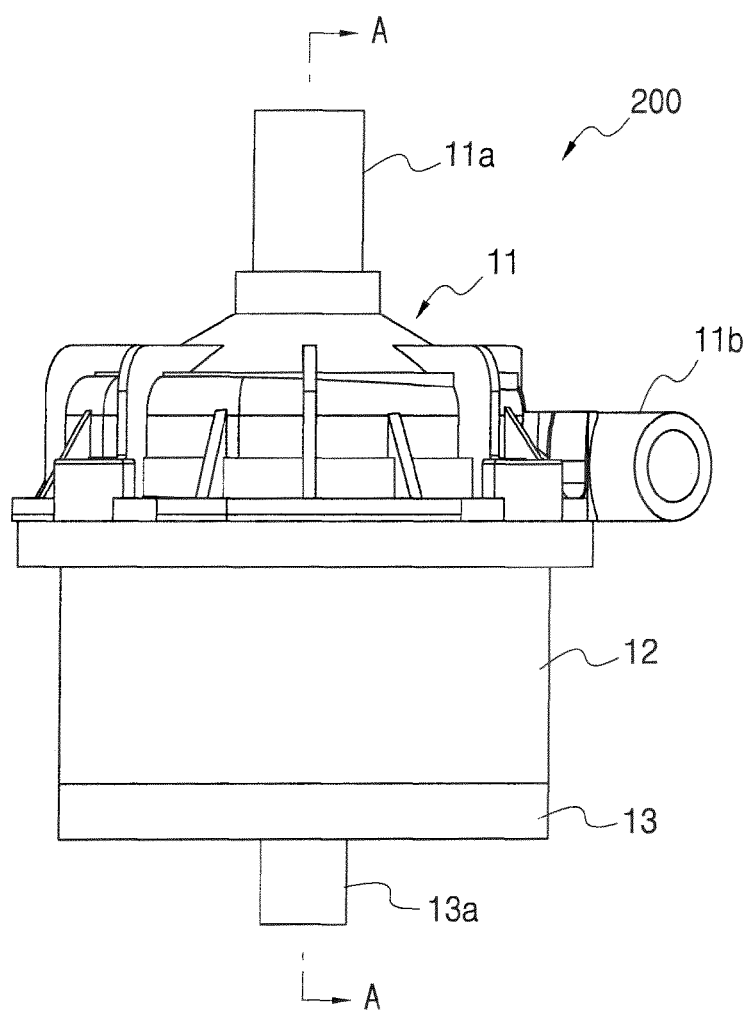
FIG. 1 is a front view of a water pump using an axial gap type motor according to an embodiment of the present invention.

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

An axial gap type motor employing a non-rare earth magnet according to an embodiment of the present invention may be implemented as a longitudinal-axis type motor, and is applied to an electric water pump (EWP), a compressor, an oil pump, etc., containing the motor therein, and an example in the following description will be described with respect to the case in which the axial gap type motor is applied to the water pump (EWP).

In addition, a design concept of a new stator core for improving noise and vibration generation is applied to the axial gap type motor according to an embodiment of the present invention.

Referring to FIGS. 1 to 6, the water pump (EWP) 200 using the axial gap type motor according to the present invention largely includes a pump housing 10, an axial gap type motor 100, an impeller 20, and a driver 50.

The pump housing 10 has an inlet 11a through which a fluid, such as cooling water, is introduced, and which is arranged at the center of one end thereof, and an outlet 11b through which the introduced fluid is discharged, and which is extended and formed at one side of the other end thereof. At the center of other end of the pump housing 10, are included: an open pump cover 11; a body case 12 which covers an open portion of the pump cover 11 to form a fluid flow passage P in the pump cover 11, and which is made of an inverted cup shape to have a lower space 14 outside the fluid flow passage P; and an upper cover 13 coupled to the bottom of the body case 12 in which a stator 40 of a motor 100 contained in the sealed lower space 14 inside the body case 12 and a driver 50 for driving the stator 40 are embedded.

The pump cover 11 and the body case 12 preferably have a cylindrical shape and have a coupling structure fixed to each other.

For fixed coupling between the pump cover 11 and the body case 12, for example, four fixing extension portions 11c protrude, and thus are respectively fastened to coupling holes with fixing screws or fixing bolts.

In addition, a circular protrusion 11d and a circular recess 12a are formed in each flange between the pump cover 11 and the body case 12, and an O-ring 63 for sealing is inserted into the recess 12a.

Furthermore, an O-ring 64 may be inserted into a coupling portion between the body case 12 and the upper cover 13 to maintain the sealing state of the lower space 14. In addition, the coupling portion between the body case 12 and the upper cover 13 may be bonded by using a laser welding method to realize a more complete sealing state.

A connector housing 13a where a terminal end for applying a driving signal to the driver 50 from the outside is arranged is extended on the lower surface of the upper cover 13.

The pump cover 11, the body case 12, and the upper cover 13 forming the pump housing 10 may be formed of, for example, a resin such as poly phenylene sulfide (PPS).

The impeller 20 in which the rotor 30 of the motor 100 is integrally formed at the lower side of the fluid flow passage P is arranged in the fluid flow passage P of the bent part between the inlet 11a and the outlet 11b of the pump cover 11.

In addition, the open lower end of the pump cover 11 is extended to secure a larger space than the inlet 11a so that the impeller 20 may be arranged in the fluid flow passage P, and the flange is extended to form a groove structure on the body case 12 corresponding to the open lower end of the pump cover 11.

A plurality of wings 23 are radially arranged between the disk-shaped upper plate 21 and the lower plate 22 to discharge a fluid such as cooling water introduced from the inlet 11a through the outlet 11b arranged at the side surface of the pump cover 11. The upper plate 21 has a through-hole formed in the center thereof and has an upper narrower and lower wider shape in which a diameter thereof increases from the upper side to the lower side, and the lower plate 22 has a circular plate surrounding the upper and outer periphery of the rotor 20. The lower plate 22 and the rotor 20 may be integrated by an insert molding method.

In addition, the bearing housing 62 is formed to protrude from the center of the lower plate 22, and the bearing housing 62 is provided with a sleeve bearing 61 rotatably supporting the rotor 20 on the support shaft 60.

It is desirable to use an oil less bearing, such as a carbon bearing or a plastic bearing in consideration of the fact that the sleeve bearing 61 is in contact with the fluid.

Meanwhile, as shown in FIGS. 2 to 6 in the present invention, as a driving means for rotating the impeller 20, an axial gap type motor 100 is employed, which includes a core-type stator 40 arranged in a sealed lower space 14 inside the body case 12 and a rotor 30 arranged to face the stator 12 in the fluid flow passage P outside the body case 12.

First, the rotor 30 has a ring-shaped back yoke 31 and a magnet 32 installed sequentially on the bottom surface of the lower plate 22 to form a single body with the impeller 20. The magnet 32 of the rotor 30 may be formed of a plurality of N-pole and S-pole split magnet segments, or may use a magnet in which the N-pole and S-pole are split and magnetized into multiple poles in a ring-shaped magnet, and the back yoke 31 is installed on the rear surface of the magnet 32 to form a magnetic circuit.

A thin partition 12b for separating the stator 40 and the rotor 30 is installed on the body case 12 to implement a complete waterproof structure for the stator 40. That is, the stator 40 arranged in the sealed lower space 14 inside the body case 12 may completely block contact with water.

The partition 12b is formed to have a relatively small thickness as compared with the cylindrical portion of the body case 12, and thus a ferrite magnet, which is a non-rare earth magnet, may be used as a magnet of the rotor 30 as described below.

In other words, the motor 100 according to the present invention is an axial gap type in which a rotor 30 and a stator 40 face each other with a thin partition 12b therebetween, and may be used in an open structure without a separate magnet waterproof structure such as a rare earth magnet. That is, in the motor 100 according to the present invention, even if the magnet 32 of the rotor 30 functions for a long time in a state of coming in contact with the cooling water flowing through the fluid flow passage P inside the pump cover 11, the performance of the magnet does not degrade. Accordingly, the motor 100 of the present invention may further reduce an air gap compared to a motor employing a rare earth magnet having a magnet waterproof structure to thereby increase efficiency.

In addition, in the present invention, when a longitudinal-axis type motor having the same external diameter as a general inner rotor type motor is applied, it is possible to reduce an air gap by separating between the rotor 30 and the stator 40 by using a thin partition 12b, and thus even if a ferrite magnet, which is a non-rare earth magnet, is used, the axial gap type motor having a magnetic energy equivalent to the case of a motor using a rare earth magnet containing Nd may be implemented.

The support shaft 60 may be integrated by insert molding in which a part of the support shaft 60 is inserted into a central portion of the partition 12b when the body case 12 is injection-molded, or may be press-fitted into a support shaft receiving portion 12c integrally formed at the central portion of the partition 12b.

A part of the support shaft accommodation portion 12c extends from the partition 12b to the lower space 14, another part thereof extends to the upper side of the partition 12b and protrudes, and has a sufficient contact area and firmly supports the lower end of the support shaft 60.

Hereinafter, the stator of an axial gap type motor according to an embodiment of the present invention will be described.

Figure 4:
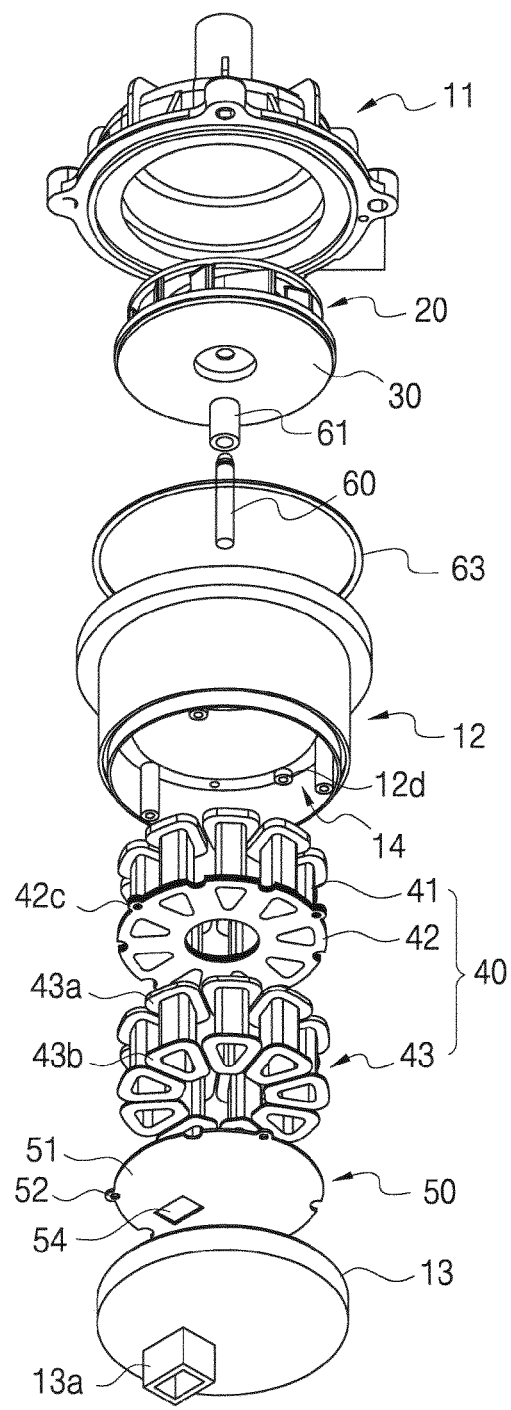
FIG. 4 is an exploded perspective view of a water pump using an axial gap type motor according to an embodiment of the present invention.
Figure 5:
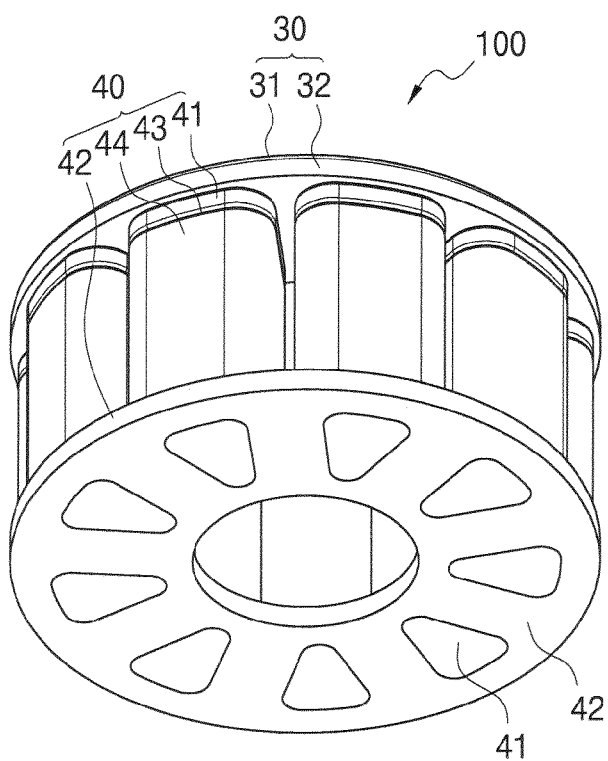
FIG. 5 is a perspective view of an axial gap type motor according to an embodiment of the present invention.
Figure 6:
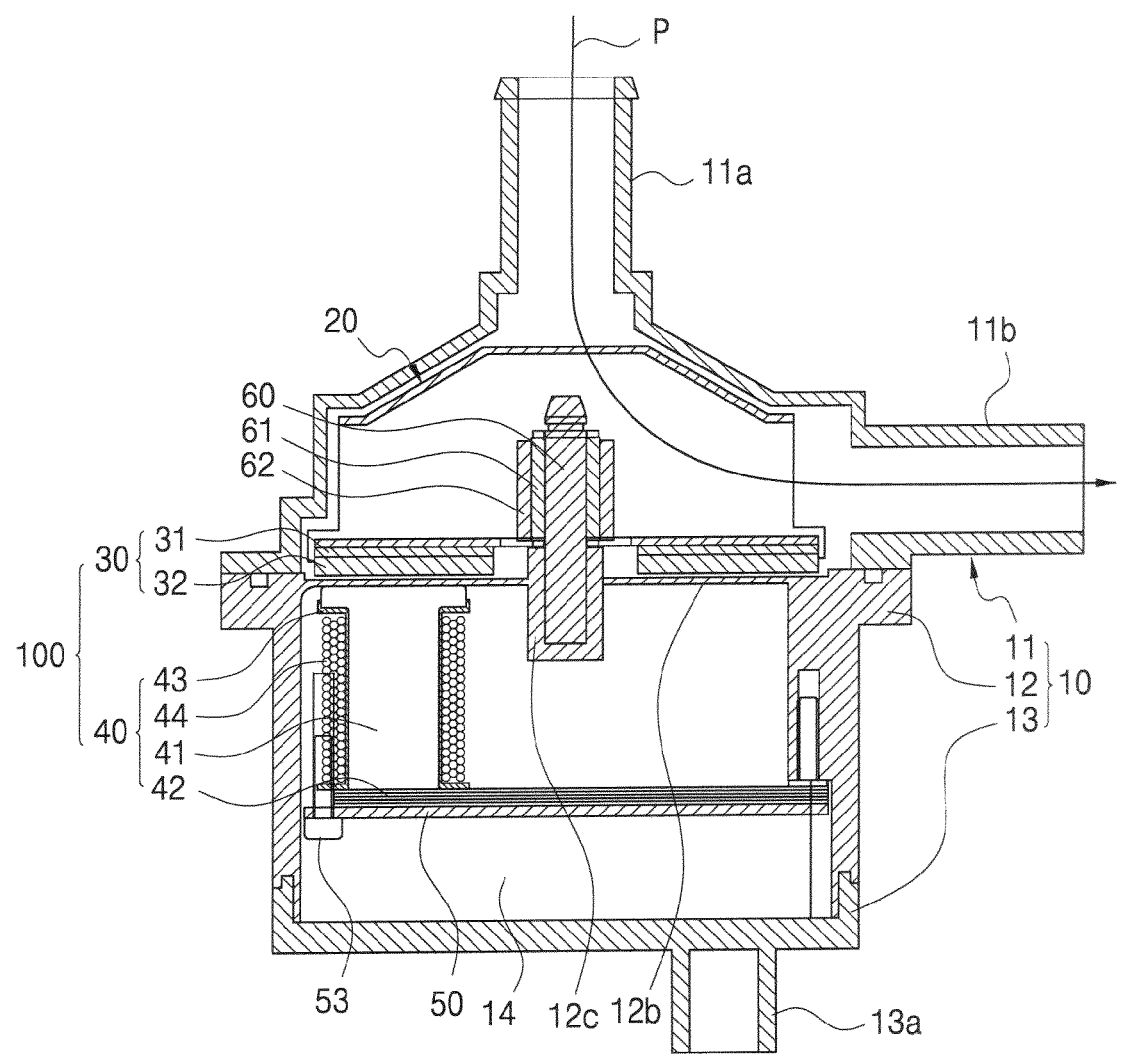
FIG. 6 is an axial cross-sectional view illustrating an implementation example of a complete waterproof structure between a stator and a rotor by installing a partition on an upper end of a body case in a water pump using an axial gap type motor according to an embodiment of the present invention.

As shown in FIGS. 4 to 6, the stator 40 is installed in the lower space 14 maintaining the sealing state, and is arranged to face the rotor 30 in the axial direction with the thin partition 12*b* interposed therebetween to form an axial gap type motor.

The stator 40 includes: a stator core 45 having a plurality of teeth 41 and a back yoke 42 interconnecting the plurality of teeth 41 to form a magnetic circuit; a plurality of bobbins 43 made of an insulating material and integrally formed to surround an outer circumferential surface of each of the plurality of teeth 41, on which a coil is wound; and a coil 44 wound around the outer circumferential surface of each of the bobbins 43.

Each of the plurality of teeth 41 forming the stator core 45 may be formed in a T-shape, and may be manufactured by compression-molding soft magnetic composites (SMC) powder, and the plurality of teeth 41 are arranged in an annular shape in parallel to the axial direction on the same circumference such that the shoe part is arranged so as to face the magnet of the rotor 30.

The teeth 41 may adopt an isotropic magnetic material having high magnetic permeability, low coercive force, and high saturated magnetic induction as the soft magnetic composites (SMC) powder, for example, powder of alloy, such as Fe—Ni, Fe—Co, and Fe—Si. When the tooth 41 are manufactured using such soft magnetic composites (SMC) powder by a compression molding or extrusion molding method, the teeth 41 may be formed in a 3D structure and the teeth 41 may have an isotropic property.

As will be described later, the method of compressing and molding the teeth 41 with the soft magnetic composites (SMC) powder is important because the round (R) shape required for curved formation may be easily formed at the front end portion of the teeth 41 facing the magnet 32 of the rotor 30, that is, at the shoe portion.

In addition to compression molding of the soft magnetic composites (SMC) powder, the teeth 41 of the present invention may be molded by mixing amorphous metal powder having a high permeability with a binder, or may be molded by mixing amorphous metal powder, spherical soft magnetic composites (SMC) powder, and a binder at a predetermined ratio. In this case, when the spherical soft magnetic composites (SMC) powder is mixed at a predetermined ratio as compared with the case where 100% of the amorphous metal powder is used, the difficulty of high-pressure sintering can be solved and the permeability can be increased.

A plurality of electrical steel sheets (silicon steel sheets) formed of thin plates are stacked on the rear ends of the plurality of teeth 41, and an annular back yoke 42 having a predetermined width by being coupled to the plurality of teeth 41 to form a magnetic circuit is arranged on the rear ends of the plurality of teeth 41.

Flanges 43*a* and 43*b* are formed at both ends of the plurality of bobbins 43, respectively, to limit a region in which the coils 44 are to be wound.

A conventional radial gap type motor uses a stator core in which a plurality of teeth are radially arranged on an inner periphery or an outer periphery of a back yoke. When the electrical steel sheets (silicon steel sheets) are blanked (in a connected form) and stacked on the back yoke and the teeth portion, it is not possible to easily form a round (R) shape required for curved surface formation on the core shape, especially the front end portion (i.e., the shoe portion) of the teeth facing the magnet of the rotor.

Figure 12A:
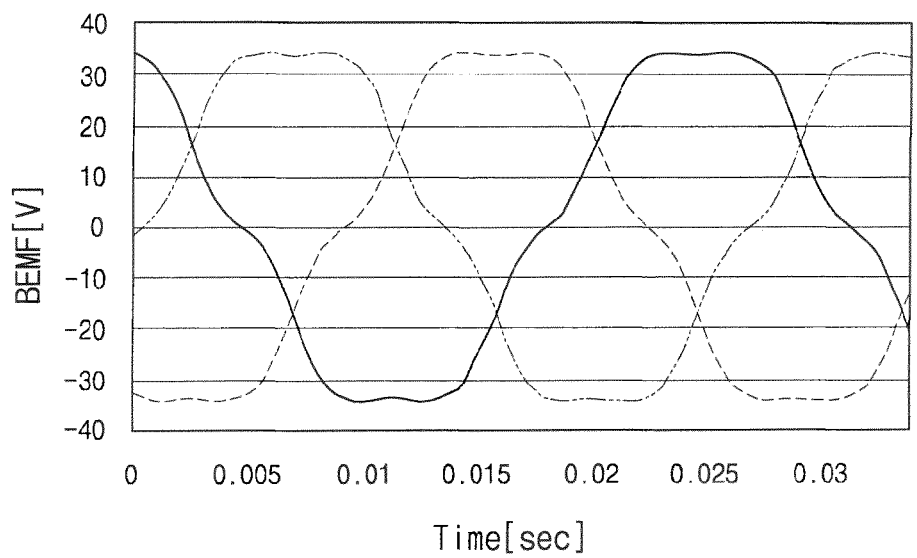
FIGS. 12A and 12B illustrate back-EMF waveforms in the form of a square wave obtained when a round (R) process is not performed on an inner shoe portion of a stator core in a conventional inner rotor motor, and a sinusoidal back-EMF waveform obtained by an axial gap type motor according to the present invention, respectively.

As a result, as illustrated in FIG. 12A, a conventional radial gap type motor has a back electronic force (back-EMF) waveform in a square wave form, and thus it is impossible to prevent noise and vibration during rotation of the motor.

The stator core 45 of the present invention is applied to an axial gap type motor unlike the stator core of the radial gap type motor, and has a structure in which the plurality of teeth 41 and the back yoke 42 are connected at a right angle, and thus it is impossible to form a thin plate stack integrated with the plurality of teeth and the back yoke.

Figure 7A:
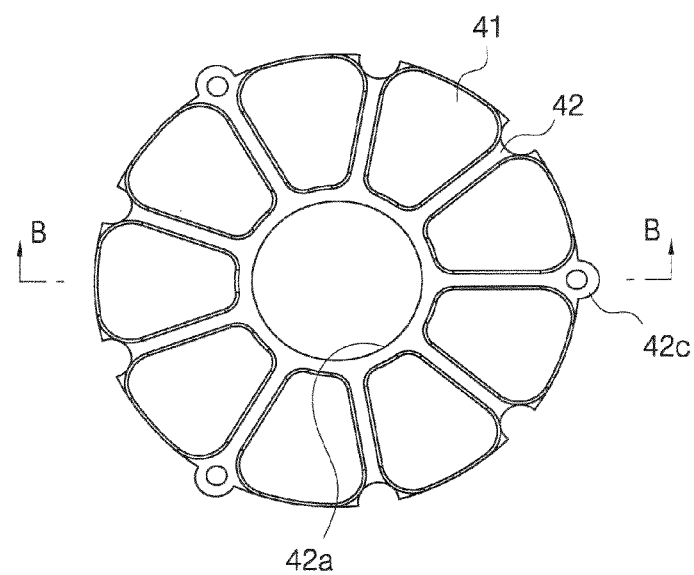
FIGS. 7A to 7D illustrate a coupling relationship between the teeth of the stator core and the back yoke according to a first embodiment in the axial gap type motor of the present invention, and show a plan view of the stator core, a plan view of the back yoke, and a cross-sectional view and a perspective view taken along the line B-B of FIG. 7A, respectively.
Figure 7B:
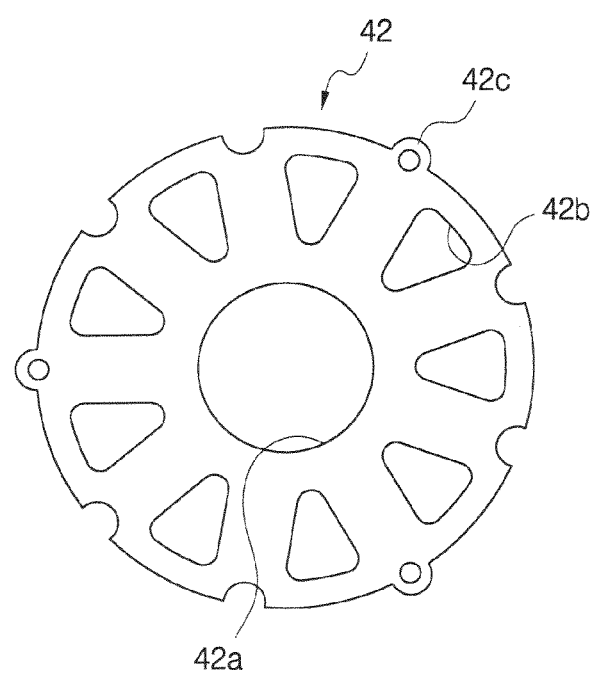
Figure 7C:
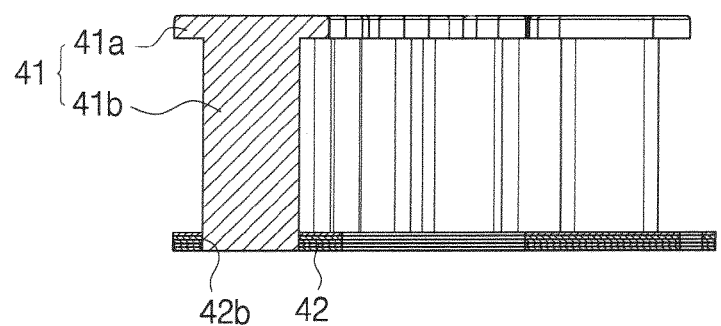
Figure 7D:
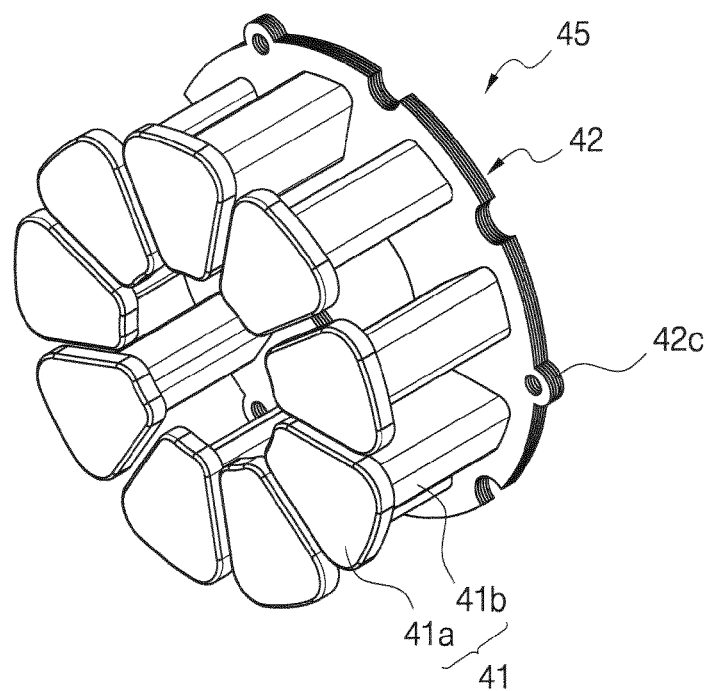
Figure 8A:
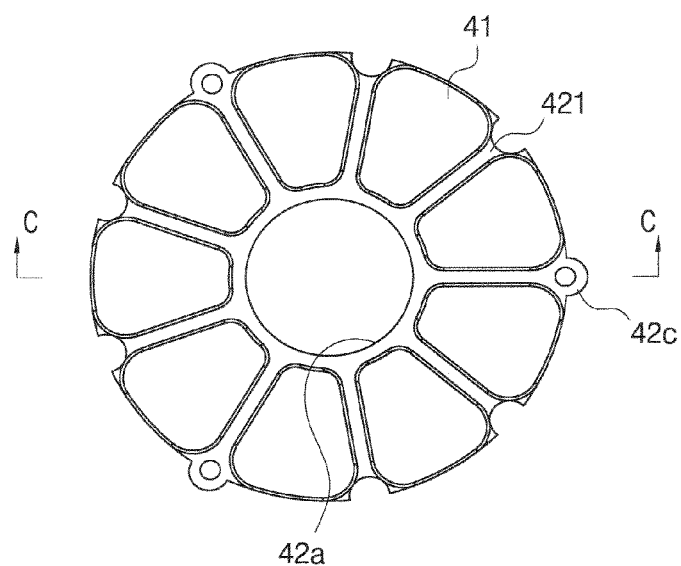
FIGS. 8A to 8D illustrate a coupling relationship between the teeth of the stator core and the back yoke according to a second embodiment in the axial gap type motor of the present invention, and show a plan view of the stator core, a plan view of the back yoke, and a cross-sectional view and a perspective view taken along the line C-C of FIG. 8A, respectively.
Figure 8B:
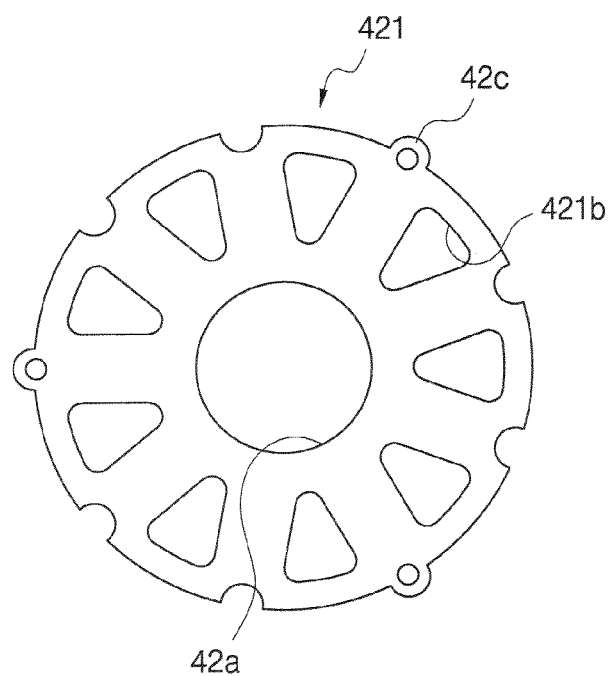
Figure 8C:
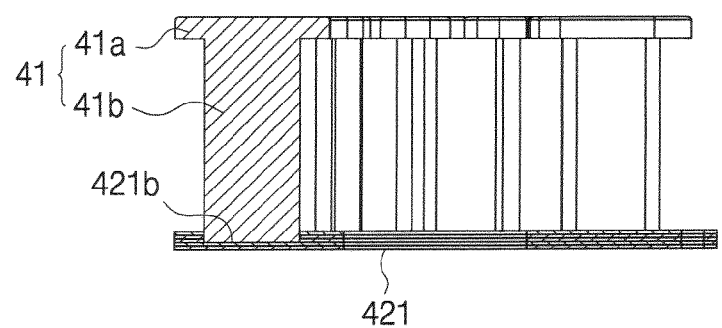
Figure 8D:
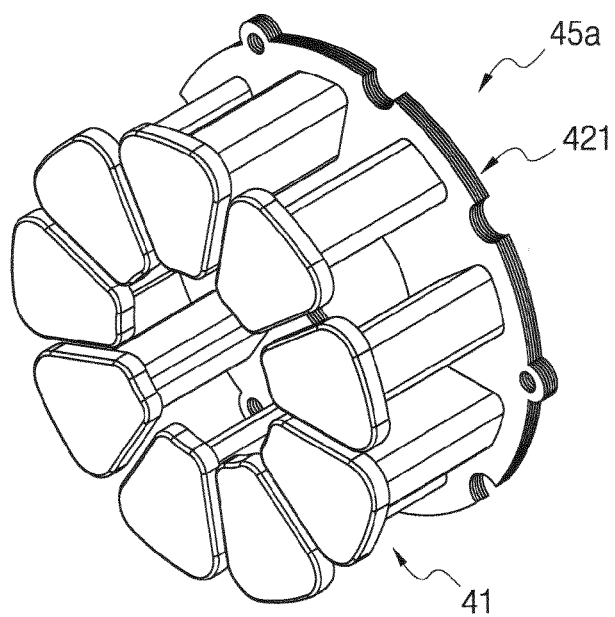

To solve this problem, in order to obtain the stator core 45 of the present invention, the teeth 41 having a complicated three-dimensional (3D) shape may be manufactured by compression molding soft magnetic composites (SMC) powder, and the back yoke 42 may be prepared by blanking and stacking the electric steel sheets (silicon steel sheets), as in the conventional case, and as shown in FIG. 7D, a plurality of soft magnetic composites (SMC) powder teeth 41 are assembled with the back yoke 42, to thereby obtain the stator core 45.

Figure 12B:
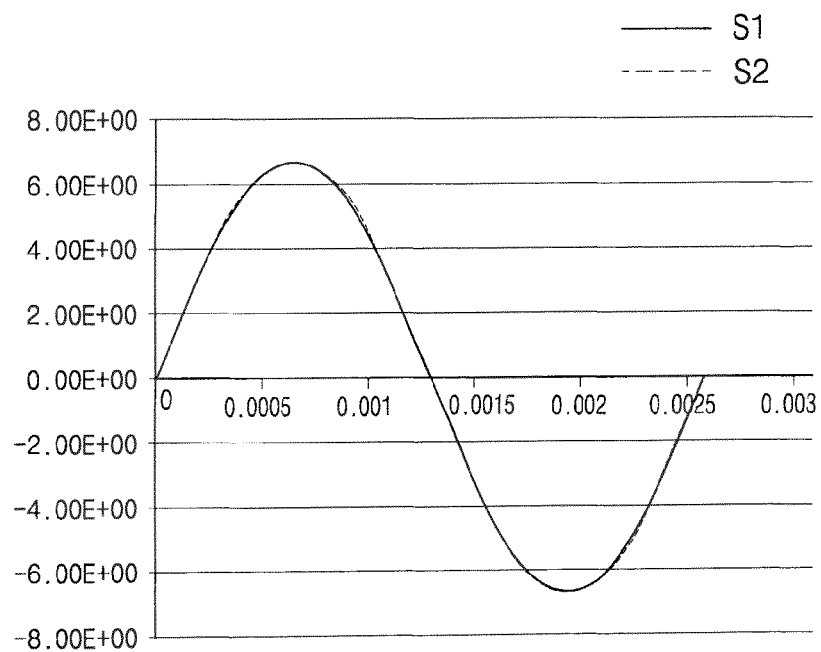

As each of the plurality of teeth 41 formed in the T-shape is compression-molded of soft magnetic composites (SMC) powder, a round (R) shape may be easily formed in the core shape to obtain a back-electromagnetic force waveform (S1: solid line) close to an ideal sine curve (S2: dashed line) as shown in FIG. 12B (distortion: 0.5%). As a result, generation of noise and vibration due to rotation of the motor may be improved.

In addition, the stator core 45 of the present invention has a structure in which the plurality of teeth 41 and the back yoke 42 are connected at right angles and is specialized for a longitudinal-axis type motor. The teeth 41 of the stator core 45 adopts soft magnetic composites (SMC) instead of a general electrical steel sheet, to have optimized the core (teeth) shape by introducing a round (R) shape into the teeth shape to minimize the core loss generated in the motor.

The stator 40 according to the present invention is fabricated to first prepare a plurality of teeth 41 using soft magnetic composites (SMC) powder, and prepare an annular back yoke 42 having a predetermined width by blanking a plurality of electric steel sheets (silicon steel sheets).

Subsequently, a bobbin 43 is integrally formed on each of the plurality of teeth 41 by insert molding each of the plurality of teeth 41 with a thermosetting resin made of an insulating material to define a region where a coil is to be wound.

Thereafter, when the coil 44 is wound on the bobbin 43 integrally formed with the teeth 41, and one end of the teeth 41 is coupled to an assembly hole 42*b* of the back yoke 42, to complete an assembly of the stator 40 illustrated in FIG. 7D.

The winding of the coil 44 to the bobbin 43 may first wind the coil 44 in a state where the teeth 41 having the bobbin integrally formed therewith are coupled to the back yoke 42.

A driver 50 for generating a rotating magnetic field by applying a driving signal to a three-phase coil of the stator 40 is installed in the lower portion of the stator 40. The driver 50 includes a printed circuit board (PCB) 51 on which various electronic components 54 forming a motor driving circuit are mounted.

A plurality of, for example, three protrusions 52 are extended on the outer periphery of the printed circuit board (PCB) 51. Each of the three protrusions 52 has a through-hole for fixing the printed circuit board (PCB) 51 to a fixing portion 12d installed in the body case 12 using a fixing screw or a fixing bolt 53.

The back yoke 42 located on the upper side of the printed circuit board (PCB) 51 also has three protrusions 42c extending in the portion corresponding to the three protrusions 52 of the printed circuit board (PCB) 51. Each of the protrusions 42c is formed with a through-hole through which the fixing screw or the fixing bolt 53 is fastened to the fixing portion 12d.

The stator core 41 of the present invention may be variously modified according to an assembly structure of the soft magnetic composites (SMC) powder teeth 41 and the back yoke 42, as described below with reference to FIGS. 7A to 11D.

Referring to FIGS. 7A to 7D, the stator core 45 according to a first embodiment of the present invention includes nine soft magnetic composites (SMC) powder teeth 41 and a back yoke 42.

The teeth 41 are formed in a T-shape by compression molding of the soft magnetic composites (SMC) powder, and the front end portion of the rotor facing the magnet, i.e., the shoe 41a, has a structure in which a flange is extended from the coil winding portion 41b in which the coil 44 is wound.

The coil winding portion 41b forms an approximately triangular pillar, and the shoe 41a forms an approximately rectangular pillar. The shoe 41a and the coil winding portion 41b have a substantially trapezoidal cross-section, and are formed as curved surfaces by performing a round (R) processing at corners which are boundaries between the respective surfaces of the shoe 41a and the coil winding portion 41b.

Accordingly, as shown in FIG. 12B, the motor employing the stator core 45 according to the first embodiment may obtain a back electrostatic force (EMF) waveform (S1) close to an ideal sine curve (S2) (distortion: 0.5%). As a result, noise and vibration generation due to rotation of the motor may be improved, and core loss generated in the motor may be minimized.

The stator core 45 according to the first embodiment of the present invention is assembled to the back yoke 42 having nine teeth 41 with nine assembly holes 42b.

The back yoke 42 is obtained by blanking and stacking a plurality of electric steel sheets (silicon steel sheets). A through-hole 42a is formed at a central portion thereof to form a ring shape with a predetermined width to serve as a magnetic circuit path between the adjacent teeth 41. Nine assembly holes 42b are formed on the same circumference.

The back yoke 42 has three protrusions 42c extending from the outer periphery. A through-hole is formed in each of the protrusions 42c, so that the protrusion 42c is fixed to the fixing portion 12d together with the fixing bolt 53 at the time of fixing the PCB 51.

The stator core 45 according to the first embodiment of the present invention may adopt a structure in which nine teeth 41 are press-fitted or positioned on the same line when nine teeth 41 are assembled into nine assembly holes 42b of the back yoke 42. In this case, the bobbin 43 on which the coil 44 is wound may serve as a stopper.

Referring to FIGS. 8A to 8D, the stator core 45a according to a second embodiment of the present invention includes nine soft magnetic composites (SMC) powder teeth 41 and a back yoke 421.

In the stator core 45a according to the second embodiment, the nine soft magnetic composites (SMC) powder teeth 41 are the same as in the first embodiment, and the second embodiment is different from the first embodiment in view of the back yoke 421.

In the back yoke 421, a through-hole 42a is formed at a central portion thereof to form a ring shape with a predetermined width to serve as a magnetic circuit path between the adjacent teeth 41. Nine assembly grooves 421b are formed on the same circumference.

The back yoke 421 according to the second embodiment may have a through-hole formed in a portion forming the assembly groove 421b, and may be completed by additionally stacking the electric steel sheets (silicon steel sheets) below the assembly groove 421b.

The stator core 45a according to the second embodiment of the present invention may adopt a structure in which nine teeth 41 are press-fitted when nine teeth 41 are assembled into nine assembly grooves 421b of the back yoke 421. In this case, the bobbin 43 on which the coil 44 is wound may serve as a stopper.

As a result, when one end of the teeth 41 is assembled to the assembly groove 421b of the back yoke 421, the contact area between the teeth 41 and the back yoke 421 increases as compared with the first embodiment.

Accordingly, as the contact area between the nine soft magnetic composites (SMC) powder teeth 41 and the back yoke 421 increases, heat is quickly dispersed from the teeth 41 through the back yoke 421 of a wide area when heat is generated from the coil 44 wound on the teeth 41, and thus the stator core 45 according to the second embodiment of the present invention provides a more excellent heat dissipation function than that of the first embodiment.

In the stator core 45a according to the second embodiment of the present invention, the soft magnetic composites (SMC) powder teeth 41 except for the back yoke 421 is configured in the same manner as in the first embodiment so that the corners of the respective borders between the surfaces of the shoe 41a and the coil winding portion 41b are round (R) processed to have a curved surface.

Accordingly, the stator core 45a according to the second embodiment is configured so that the corners of the respective borders between the surfaces of the shoe 41a and the coil winding portion 41b are round (R) processed to obtain a back-electromagnetic force waveform (S1) close to an ideal sine curve (S2) as shown in FIG. 12B (distortion: 0.5%). As a result, noise and vibration generation due to rotation of the motor may be improved, and core loss generated in the motor may be minimized.

Referring to FIGS. 9A to 9D, the stator core 45b according to a third embodiment of the present invention includes nine soft magnetic composites (SMC) powder teeth 411 and a back yoke 421.

In the stator core 45b according to the third embodiment, the back yoke 421 is the same as in the second embodiment, and the third embodiment is different from the second embodiment in view of the nine soft magnetic composites (SMC) powder teeth 411.

The teeth 411 are formed in a T-shape by compression molding of the soft magnetic composites (SMC) powder, and the front end portion of the rotor facing the magnet, i.e., the shoe 411a, has a structure in which a flange is extended from the coil winding portion 41b in which the coil 44 is wound.

Figure 9A:
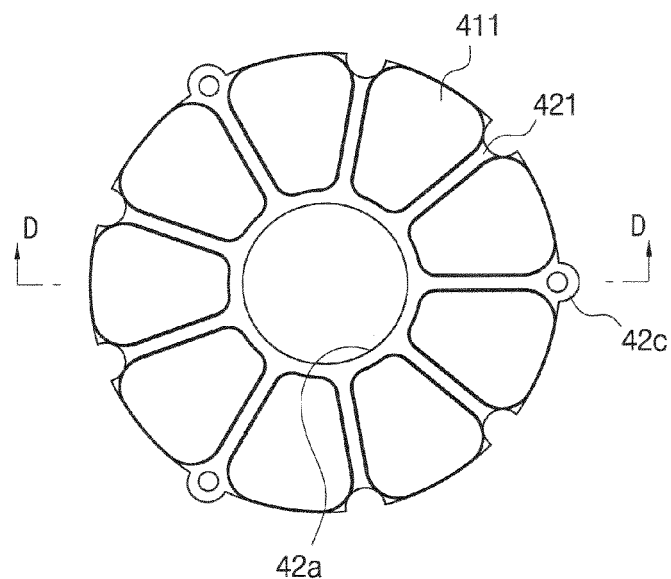
FIGS. 9A to 9D illustrate a coupling relationship between the teeth of the stator core and the back yoke according to a third embodiment in the axial gap type motor of the present invention, and show a plan view of the stator core, a plan view of the back yoke, and a cross-sectional view and a perspective view taken along the line D-D of FIG. 9A, respectively.
Figure 9B:
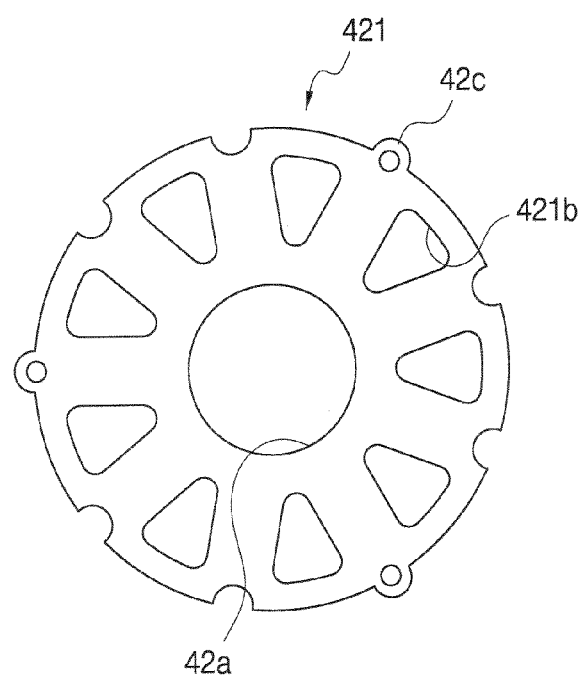
Figure 9C:
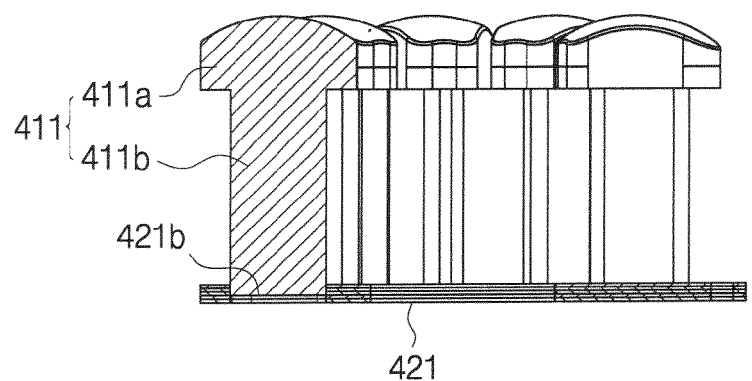
Figure 9D:
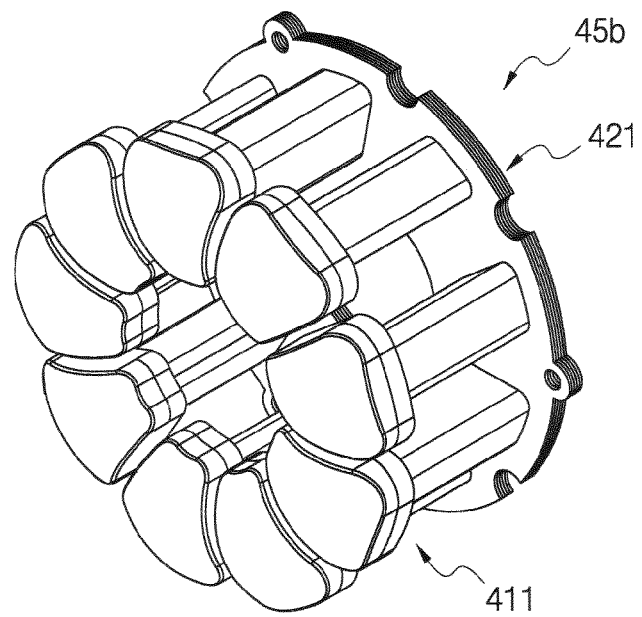

The coil winding part 41b forming the teeth 411 is formed of an substantially triangular pillar, and the shoe 411a is formed of an substantially rectangular pillar. The shoe 411a has a substantially trapezoidal cross-section and the corners of the respective borders between the surfaces of the shoe 411a and the coil winding portion 41b are round (R) processed to have a curved surface. In addition, as shown in FIG. 9C, the shoe 411a facing the magnet of the rotor has a curved front end portion.

Accordingly, the stator core 45b according to the third embodiment is configured so that the corners of the respective borders between the surfaces of the shoe 411a and the coil winding portion 41b are round (R) processed to obtain a back-electromagnetic force waveform (S1) close to an ideal sine curve (S2) as shown in FIG. 12B. As a result, generation of noise and vibration due to rotation of the motor may be improved.

In addition, the stator core 45b according to the third embodiment may minimize the core loss generated in the motor and have excellent heat dissipation function.

The stator core 45b according to the third embodiment of the present invention may adopt a structure in which nine teeth 41 are press-fitted when the teeth 41 are assembled into assembly grooves 421b of the back yoke 421, in the same manner as the second embodiment. In this case, the bobbin 43 on which the coil 44 is wound may serve as a stopper.

Referring to FIGS. 10A to 10D, the stator core 45c according to a fourth embodiment of the present invention includes nine soft magnetic composites (SMC) powder teeth 41 and a back yoke 422.

In the stator core 45c according to the fourth embodiment, the nine soft magnetic composites (SMC) powder teeth 41 are the same as in the first embodiment, and the fourth embodiment is different from the first embodiment in view of the back yoke 422.

Figure 10A:
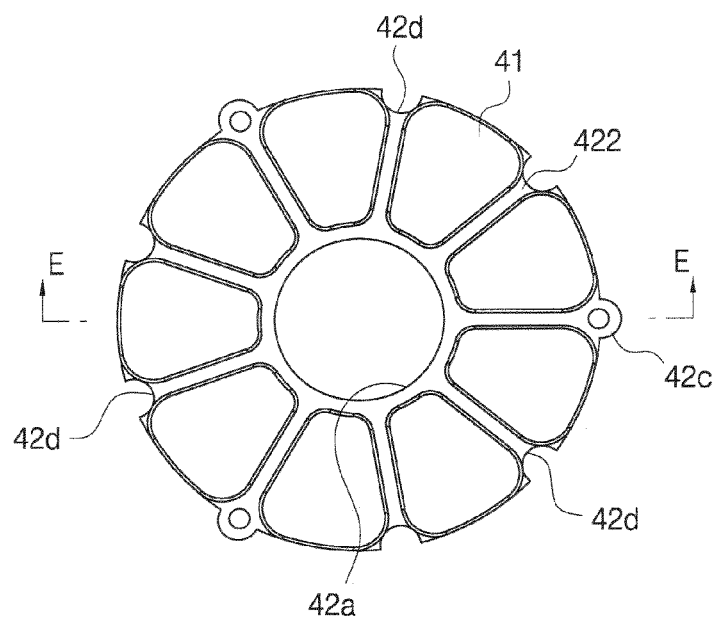
FIGS. 10A to 10D illustrate a coupling relationship between the teeth of the stator core and the back yoke according to a fourth embodiment in the axial gap type motor of the present invention, and show a plan view of the stator core, a plan view of the back yoke, and a cross-sectional view and a perspective view taken along the line E-E of FIG. 10A, respectively.
Figure 10B:
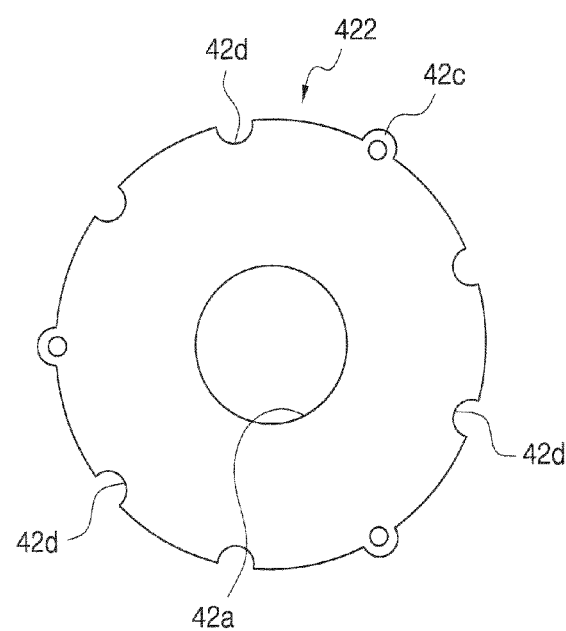

In the fourth embodiment, as shown in FIG. 10B, the back yoke 422 has a through-hole 42a formed in the center thereof to form a ring shape having a predetermined width so as to serve as a magnetic circuit path between adjacent teeth 41, and an assembly hole in which one end of the teeth 41 is assembled is not formed.

Figure 10C:
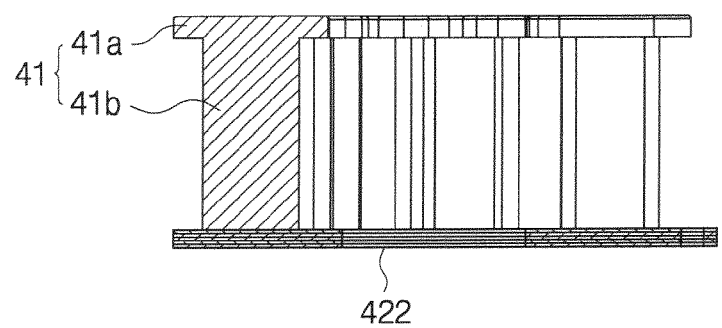
Figure 10D:
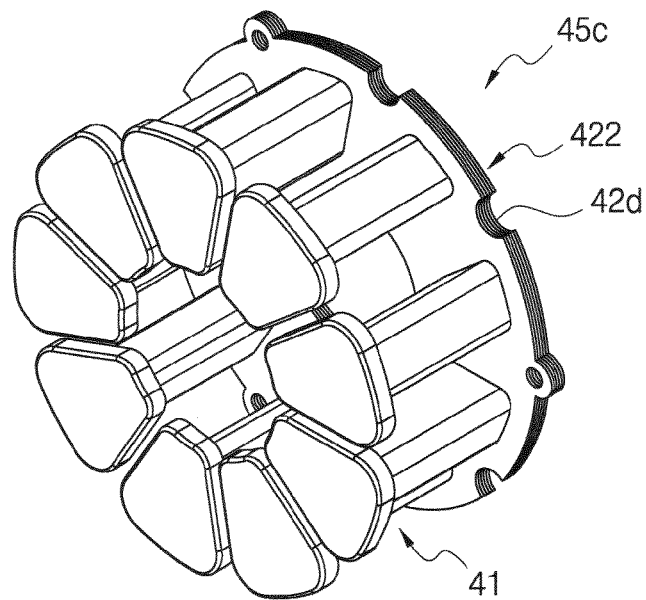

As shown in FIG. 10C, the stator core 45c according to the fourth embodiment of the present invention has a face-to-face junction between nine soft magnetic composites (SMC) powder teeth 41 and the back yoke 422.

Therefore, the stator core 45c according to the fourth embodiment may be fixed to a fixing portion provided inside the body case 12 by fastening a fixing screw or a fixing bolt 53 to a plurality of assembly slots 42d formed on the outer periphery of the back yoke 422 for assembly between the nine soft magnetic composites (SMC) powder teeth 41 and the back yoke 422.

Referring to FIGS. 11A to 11D, the stator core 45d according to a fifth embodiment of the present invention includes nine soft magnetic composites (SMC) powder teeth 41 and a back yoke 42.

Figure 11A:
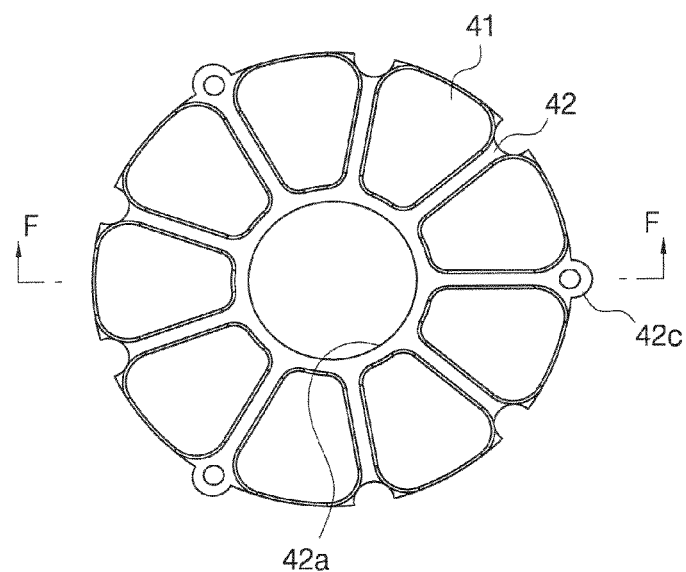
FIGS. 11A to 11D illustrate a coupling relationship between the teeth of the stator core and the back yoke according to a fifth embodiment in the axial gap type motor of the present invention, and show a plan view of the stator core, a plan view of the back yoke, and a cross-sectional view and a perspective view taken along the line F-F of FIG. 11A, respectively.
Figure 11B:
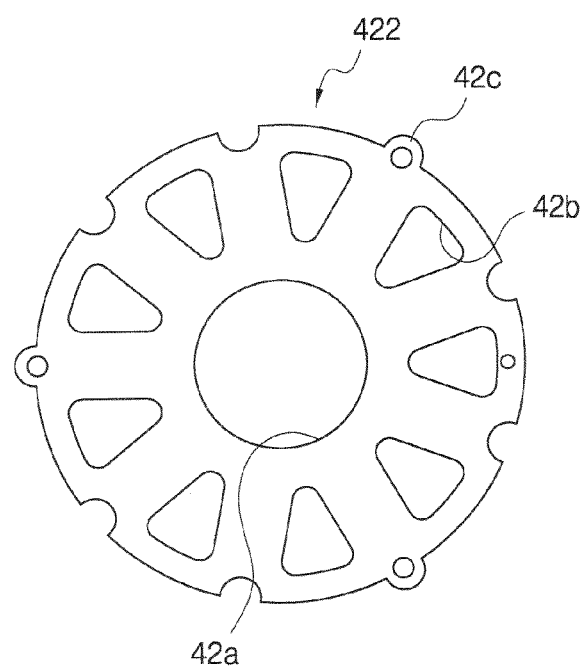
Figure 11C:
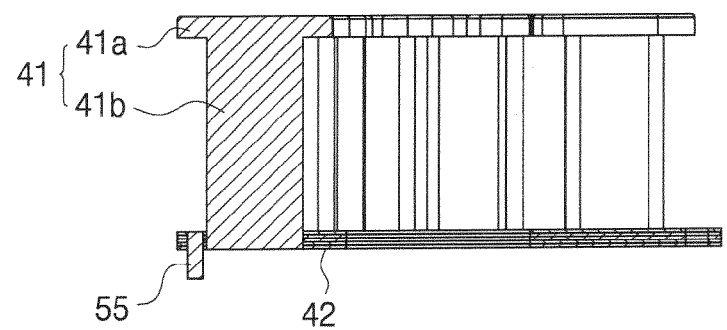
Figure 11D:
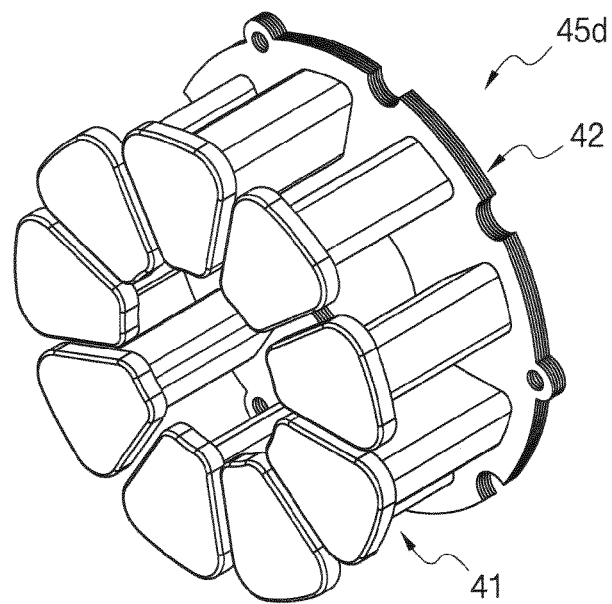

The stator core 45d according to the fifth embodiment is the same as the first embodiment in view of the nine soft magnetic composites (SMC) powder teeth 41 and the back yoke 42. The fifth embodiment differs from the first embodiment in that the pin 55 is installed in the back yoke 42 for coupling between the back yoke 42 and the PCB 51 to improve the EMC and EMI as shown in FIG. 11C.

Conventionally, a bearing housing or core bottom is grounded using a ring for grounding, and thus, a separate connection configuration, such as a jumper wire, is required, and thus, a problem has occurred in terms of production costs and assembly.

In the present invention, a hole is made in the back yoke 42, the pin 55 is press-fitted into the hole, the PCB 51 is assembled with the back yoke 42, and the pin 55 is soldered to the PCB 51 when the pin 55 is exposed to the front surface of the PCB 51, thus adopting a method of interconnecting the GND of the back yoke 42 and the PCB 51 and thereby improving EMC and EMI.

Figure 2:
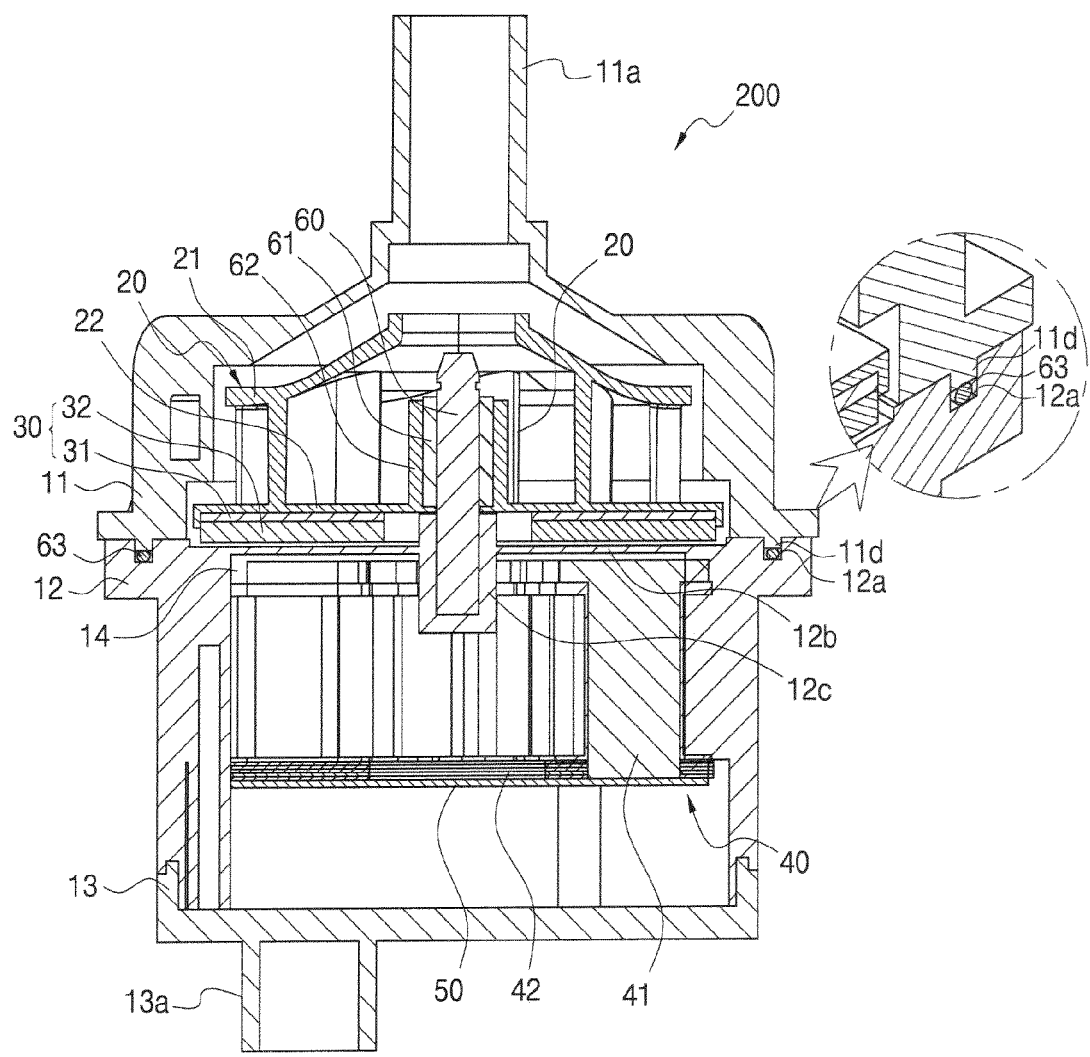
FIG. 2 is a cross-sectional view of line A-A of FIG. 1.
Figure 3:
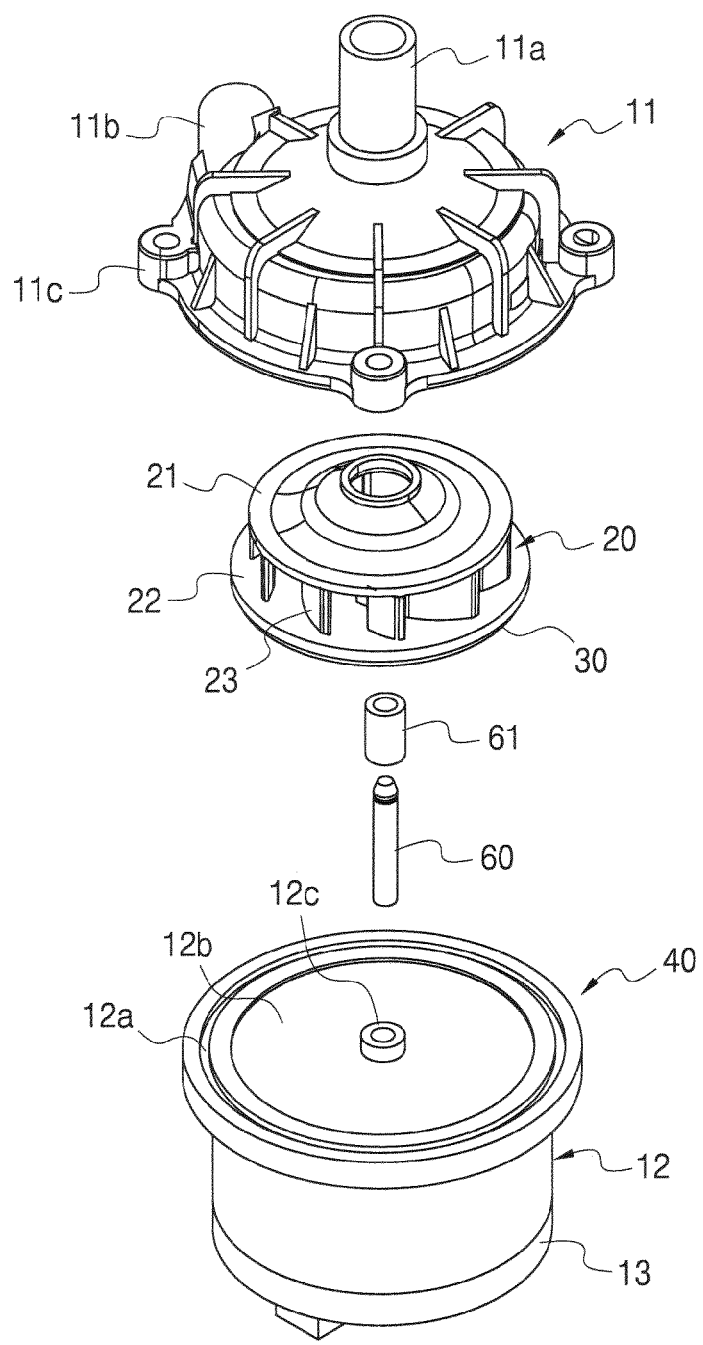
FIG. 3 is an exploded perspective view of each assembly of a water pump using an axial gap type motor according to an embodiment of the present invention.

In the stator core 45 according to the present invention, when heat is generated from the coil 44 wound on the teeth 41, heat is quickly dispersed from the teeth 41 through the back yoke 42 of a large area. As shown in FIGS. 2 and 6, heat radiation may be accomplished in a manner that the back yoke 42 is fixed to the body case 12 through a fixing screw or a fixing bolt 53 or a part of the back yoke 42 is bonded to the body case 12.

In the first to fifth embodiments, only the teeth (41) have been made of soft magnetic composites (SMC) powder, and the back yoke (42) has been stacked after blanking thin electric steel sheets (silicon steel sheets). However, the present invention is not limited thereto, and it is of course possible to assemble both the teeth and the back yoke after being made of soft magnetic composites (SMC) powder.

Figure 13:
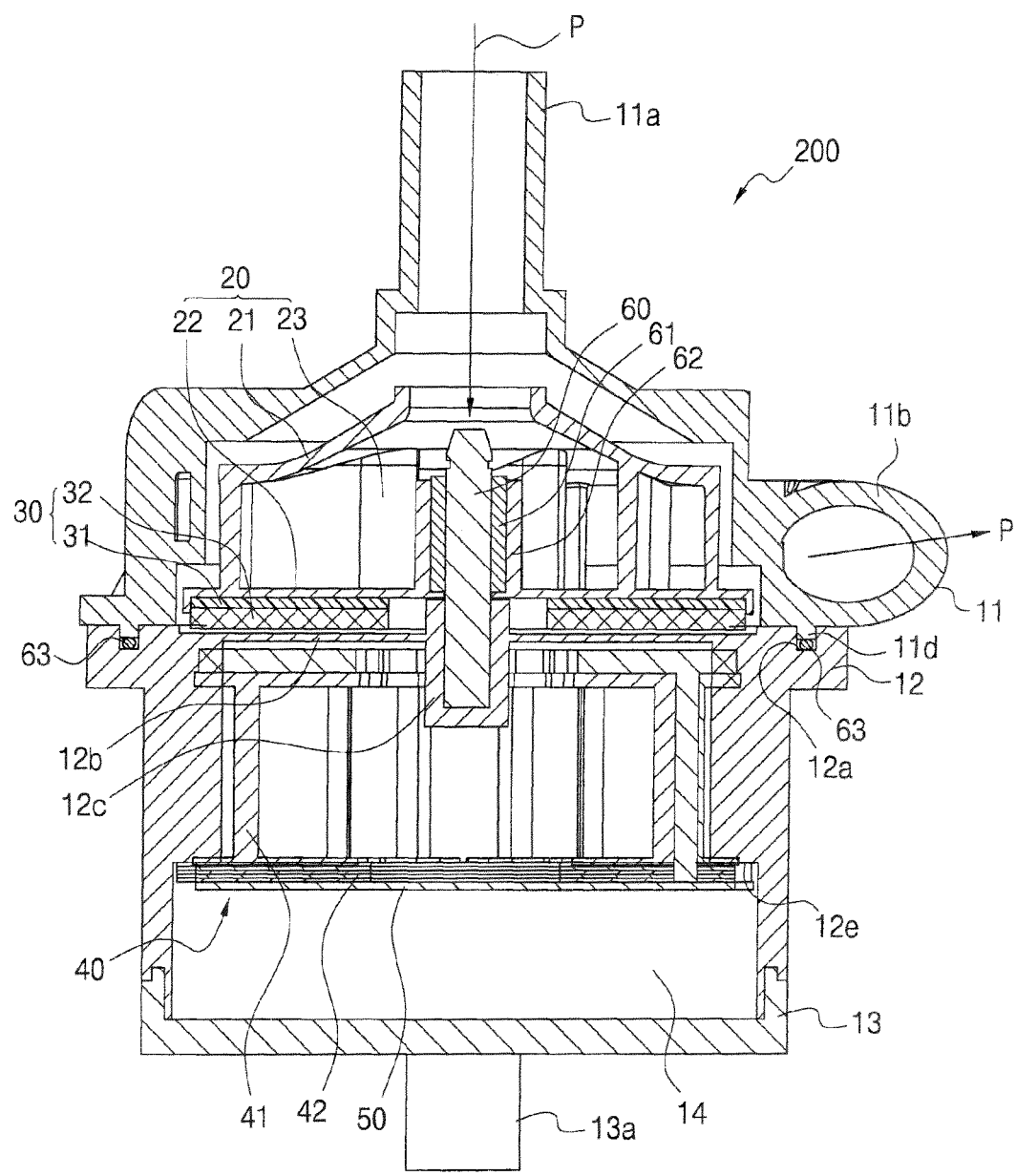
FIG. 13 is an axial cross-sectional view illustrating an axial gap type motor in which a back yoke connected to teeth (i.e., a coil winding portion) is bonded to an outer case to dissipate heat, and the back yoke is used as a heat sink of a PCB to thereby optimize heat generation.

Referring to FIG. 13, in the axial gap type motor 100 according to the present invention, a stator core 45 includes a soft magnetic composites (SMC) powder teeth 41 and a back yoke 42.

In this case, the back yoke 42 is formed of an electric steel sheet (silicon steel sheet) or a soft magnetic composites (SMC) powder, has a ring shape with a predetermined width, and is respectively connected at a right angle to the teeth 41 arranged parallel to the axial direction, and thus, the back yoke 42 is arranged at a right angle with respect to the axial direction.

A stepped portion 12e is formed on the inner circumferential surface of the body case 12 at a portion facing the back yoke 42. A part of the outer surface of the back yoke 42 is assembled to contact the stepped portion 12e, and may be fixed using, for example, a fixing screw or a fixing bolt 53 as illustrated in FIG. 6.

When a part of the outer surface of the back yoke 42 is assembled to contact the stepped portion 12e, the back yoke 42 may be fixed to the inner circumferential surface of the body case 12 by a press-fitting coupling method.

In this way, as the back yoke 42 is assembled to contact the inner circumferential surface of the body case 12, when heat is generated from the coil 44 wound on the teeth 41, heat may be quickly dispersed through the back yoke 42 of a large area, and then heat may be discharged to the outside of the water pump through the body case 12.

In addition, in the axial gap type motor 100 according to the present invention, the stator core 45 is composed of the soft magnetic composites (SMC) powder teeth 41 and the back yoke 42, and the printed circuit board (PCB) 51 forming a driver 50 is closely attached and arranged on the bottom surface of the back yoke 42.

A plurality of, for example, three protrusions 52 are extended on the outer periphery of the printed circuit board (PCB) 51. When the printed circuit board (PCB) 51 is fastened to the fixing portion 12d installed inside the body case 12 with the fixing screw or the fixing bolt 53 via the through-holes formed in the three protrusions 52, respectively, the back yoke 42 may also be fixed together.

Various electronic components 54 forming a motor driving circuit are mounted on the PCB 51, and the electronic components 54 may include heating elements.

Therefore, when heat is generated from the electronic components 54, heat dissipation may be performed through the back yoke 42 and the body case 12 which are in close contact with the printed circuit board (PCB).

In addition, as another method of cooling the printed circuit board (PCB) 51, a cooling heat dissipation pad (not illustrated) may be installed between the back yoke 42 and the printed circuit board (PCB) 51 to transfer heat to the back yoke 42 through the heat dissipation pad, and then heat may be radiated to the outside through the body case 12.

Figure 14A:
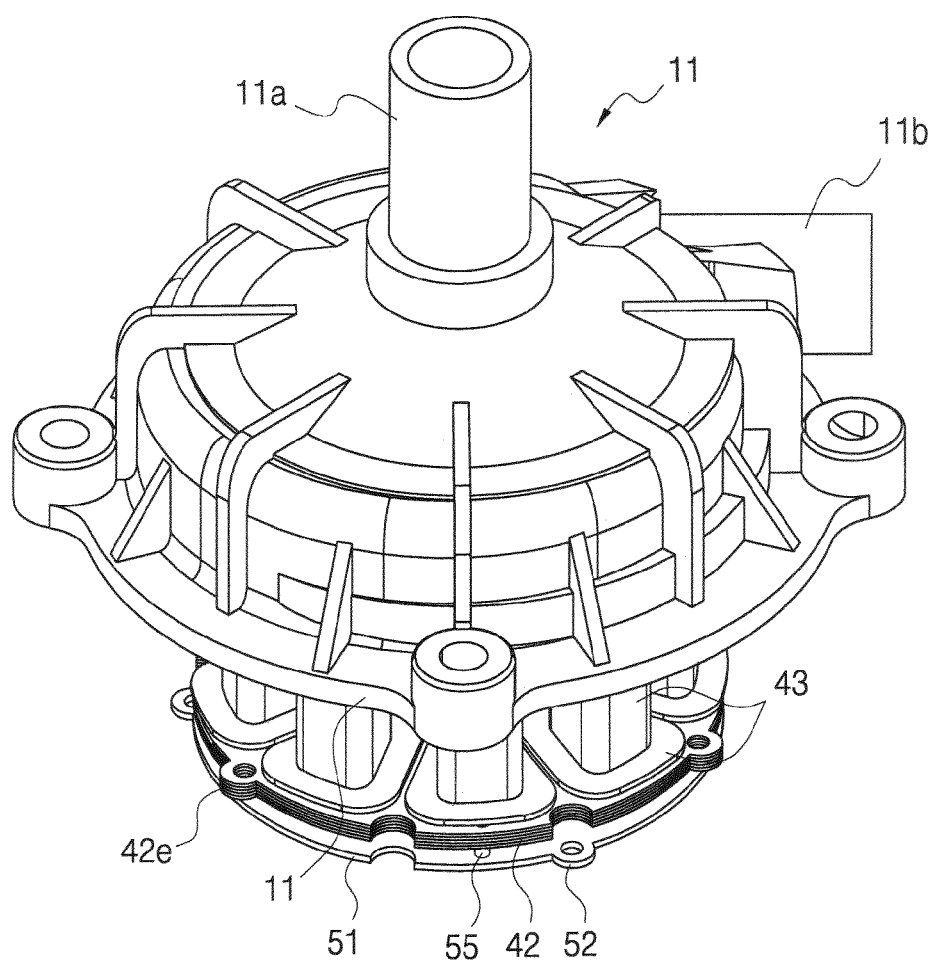
FIGS. 14A and 14B are perspective views illustrating a coupling structure between the back yoke and the PCB by placing a pin on the back yoke to connect the back yoke and the PCB or soldering the back yoke to a land portion of the rear surface of the PCB to ground (GND), to thereby improve EMC and EMI effects.
Figure 14B:
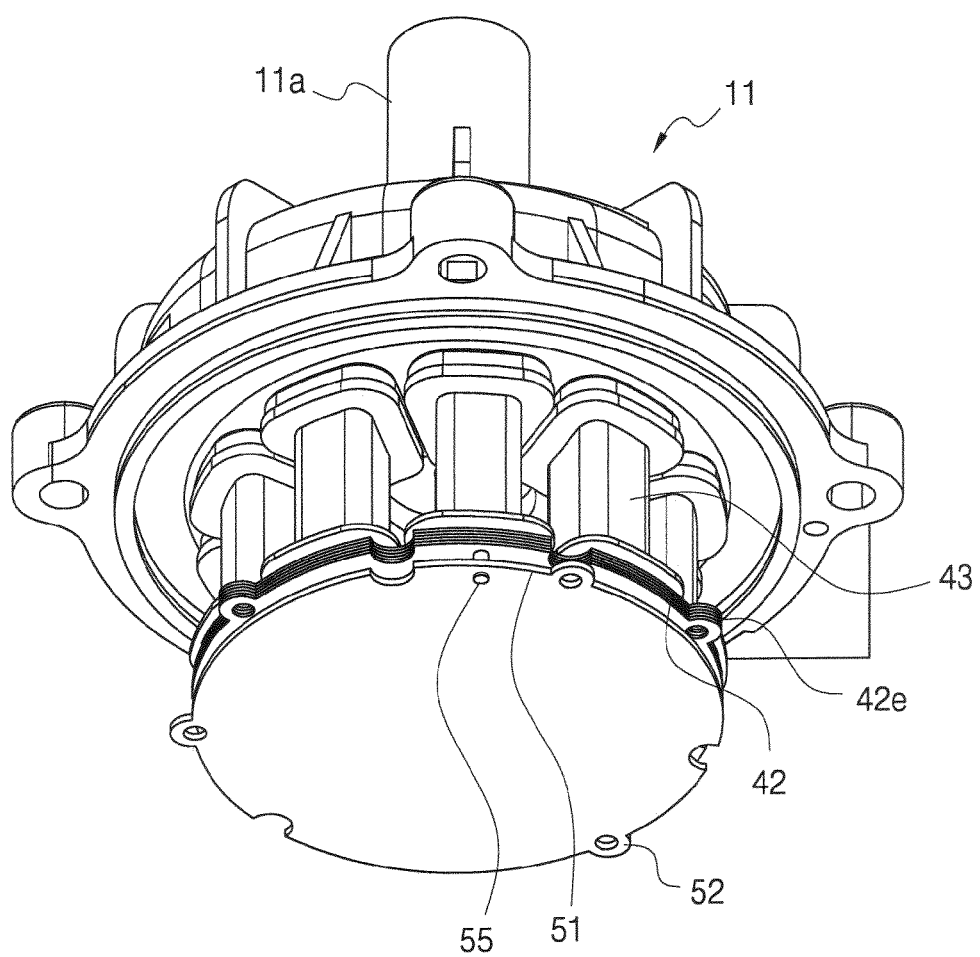

FIGS. 14A and 14B illustrate coupling structures between the back yoke and the PCB, respectively, by placing a pin on the back yoke to connect the back yoke and the PCB or soldering the back yoke to a land portion of the rear surface of the PCB to ground (GND), to thereby improve EMC and EMI effects.

In the related art, since a bearing housing or a core bottom end is grounded by using a ring for grounding, a separate connection configuration, such as a jumper wire is required, and thus production costs and assembly are problematic.

In the present invention, as illustrated in FIGS. 14A and 14B, a hole is formed in the back yoke 42 to press-fit the pin 55, and the PCB 51 is assembled to solder the pin 55 when the pin 55 comes out from the front surface of the PCB 51. As a result, the EMC and EMI improvement effects may be achieved by adopting a method of electrically interconnecting the GND of the back yoke 42 and the PCB 51 using the pin 55.

FIG. 11C shows an example in which a hole is formed in the back yoke 42 to press-fit the pin 55.

The back yoke 42 and the ground GND of the PCB 51 may be connected to each other to be directly grounded.

As shown in FIGS. 2 and 6, the direct ground GND is performed by bonding a land portion formed on the rear surface of the PCB 51 to the back yoke 42 using lead during surface mounting (SMD) and electrically interconnecting the land portion and the back yoke 42.

The back yoke 42 connected to the PCB 51 is connected to the body case 12.

The axial gap type electric motor 100 according to an embodiment of the present invention connects the back yoke 42 with the PCB 51, thereby improving EMC and EMI effects.

In the water pump 200 according to the present invention, the axial gap type motor 100 may be composed of, for example, a BLDC motor having a 10-pole-9-slot structure. In addition, when the coil 44 of the stator 40 is wound on the plurality of teeth 41, the motor 100 may be configured to wind the coil 44 in a U, V, and W three-phase structure, and the other ends of the U, V, and W three-phase coils 44 may be connected in a star-connection method. Further, the motor 100 may be driven by a 6-step propagation driving method using an inverter, for example.

The axial gap type motor 100 for the water pump 200 according to the present invention has a structure that the stator 40 is placed in the lower space 14 inside the body case 12, which is a waterproof space completely separated from the fluid flow passage P inside the pump cover 11, the rotor 30 is integrally formed with the impeller 20 and is arranged in the fluid flow passage P, and the stator 40 and the rotor 30 are separated by the partition 12b.

The axial gap type motor 100 according to the present invention is provided such that when a water pump control signal is applied to the driver 50 from a controller for the water pump 200 inside the vehicle, the driver 50 applies a driving signal to the stator coil 44 of the axial gap type motor 100 from the driver 50 upon receiving a position signal of the rotor from a Hall sensor (not shown), and the stator 40 generates a rotating magnetic field from the plurality of teeth 41.

When a rotating magnetic field is generated from the plurality of teeth 41 of the stator 40, the rotor 30 arranged in the fluid flow passage P through the partition 12b rotates around the support shaft 60 together with the impeller 20. As a result, cooling water is introduced from the inlet 11a of the pump cover 11 according to the rotation of the impeller 43, and the introduced cooling water is discharged to the outlet 11b along the fluid flow passage P.

In the present invention, complete waterproofing of the stator 40 of the motor 100 may be realized by driving the impeller 20 and the rotor 30 arranged inside the fluid flow passage P in a magnetic-coupling manner by the stator 40 of the motor 100 arranged outside the fluid flow passage P.

Moreover, in the present invention, since the stator 40 of the motor 100 is completely isolated from the fluid flow passage P, a separate waterproof treatment may be omitted, and thus, the air gap between the rotor 30 and the stator 40 of the motor 100 may be set to an optimum state to improve efficiency of the motor 100.

In addition, in the present invention, the stator 40 of the motor is completely isolated from the fluid flow passage P, and thus, it is possible to support the support shaft 60 of the motor with a general bearing without employing a waterproof structure, thereby reducing cost and improving durability.

The present invention may have magnetic energy equivalent to that of a motor using a rare earth magnet even when a ferrite magnet, which is a non-rare earth magnet, is used by applying a longitudinal axis type motor having the same external diameter as an inner-rotor type motor.

In the present invention, the stator core 45 of the longitudinal-axis type motor may employ soft magnetic composites (SMC) instead of a general electric steel sheet to optimize the shape of the core so as to minimize core loss generated in the motor.

In addition, in the present invention, by manufacturing the teeth of the stator core 45 by the compression molding method using SMC powder, noise and vibration generation may be improved by forming a round (R) shape in the core (teeth) shape to obtain a back electromotive force (back-EMF) waveform in a sine curve shape.

Meanwhile, in the embodiment described above, the design of a new stator core for improving noise and vibration generation of the present invention has been described with respect to an example of an axial gap type motor in which a rotor and a stator are arranged facing each other in an axial direction. However, the design of the new stator core of the present invention may also be applied to a radial gap type motor in which a rotor and a stator are arranged facing each other in a circumferential direction.

For example, the present invention may be applied to a radial gap type motor having an outer rotor type structure in which a stator is arranged inside and a rotor is arranged outside.

In the present invention, even when the entire stator core including the teeth and the back yoke is composed of general electric steel sheets in an outer rotor type structure among radial gap type motors, it is also possible to obtain a back electromotive force (back-EMF) waveform in a sine curve form by forming a round (R) in a partial shape of a shoe of a core facing the magnet of the rotor.

Hereinafter, an embodiment in which the radial gap type motor according to the present invention is applied to a roof fan for a vehicle will be described.

Figure 15A:
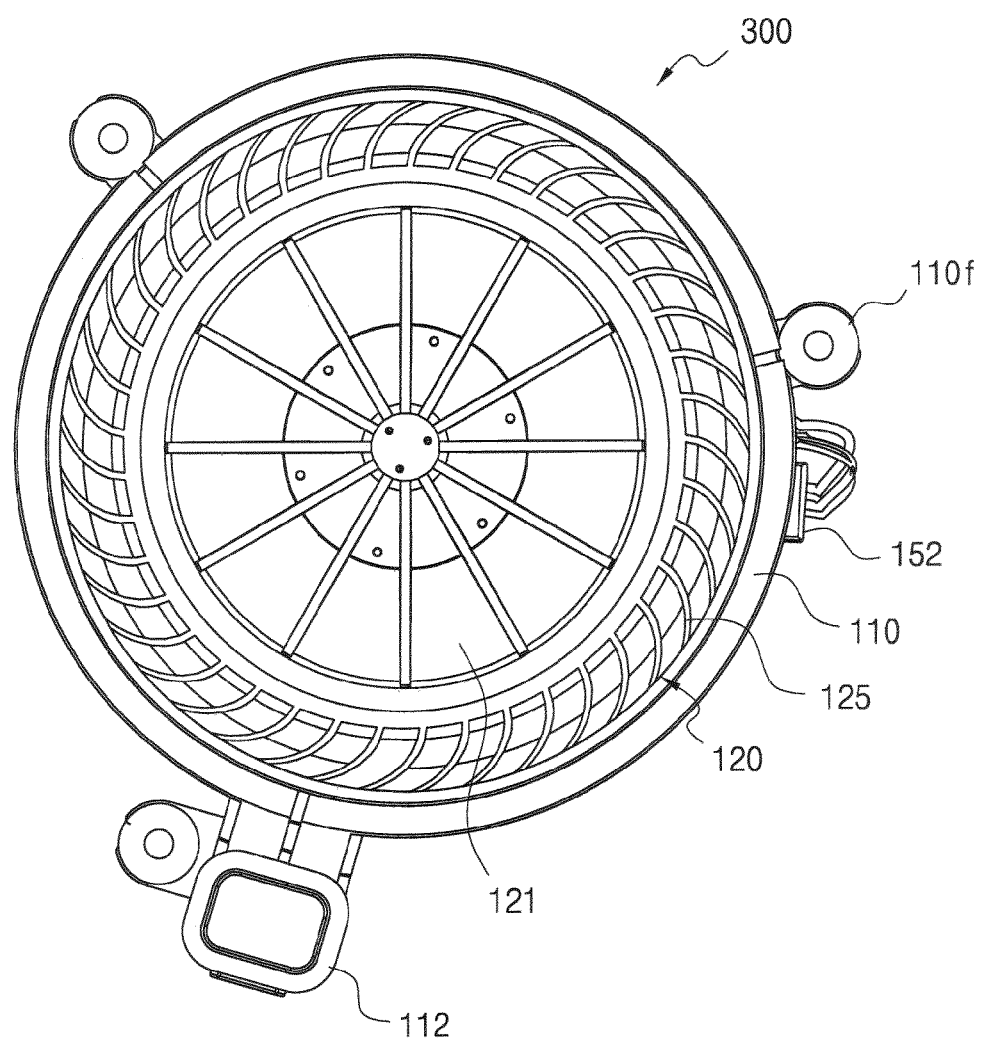
FIGS. 15A and 15B are a plan view and a rear view showing a roof fan using a radial gap type motor according to the present invention, respectively.
Figure 15B:
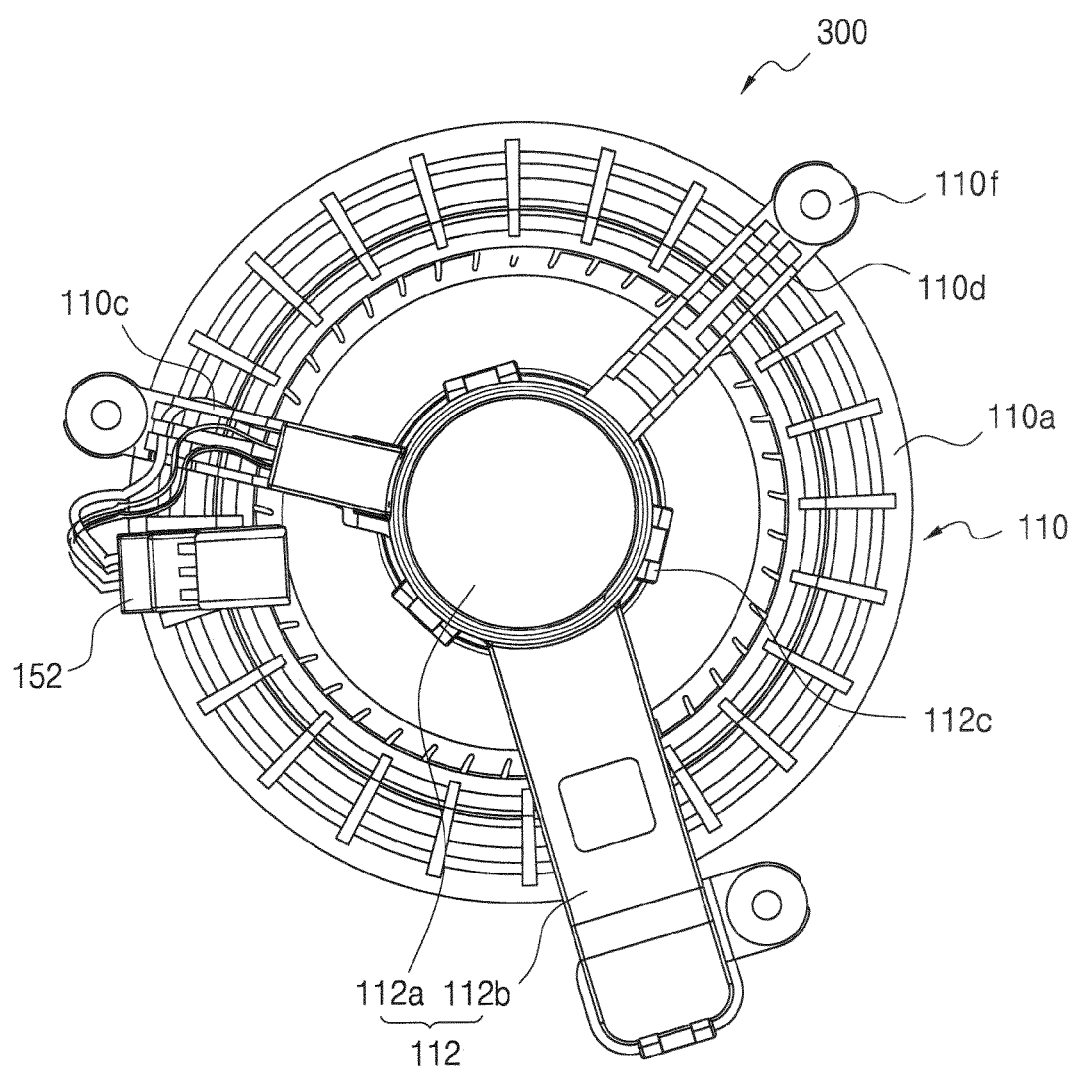
Figure 15C:
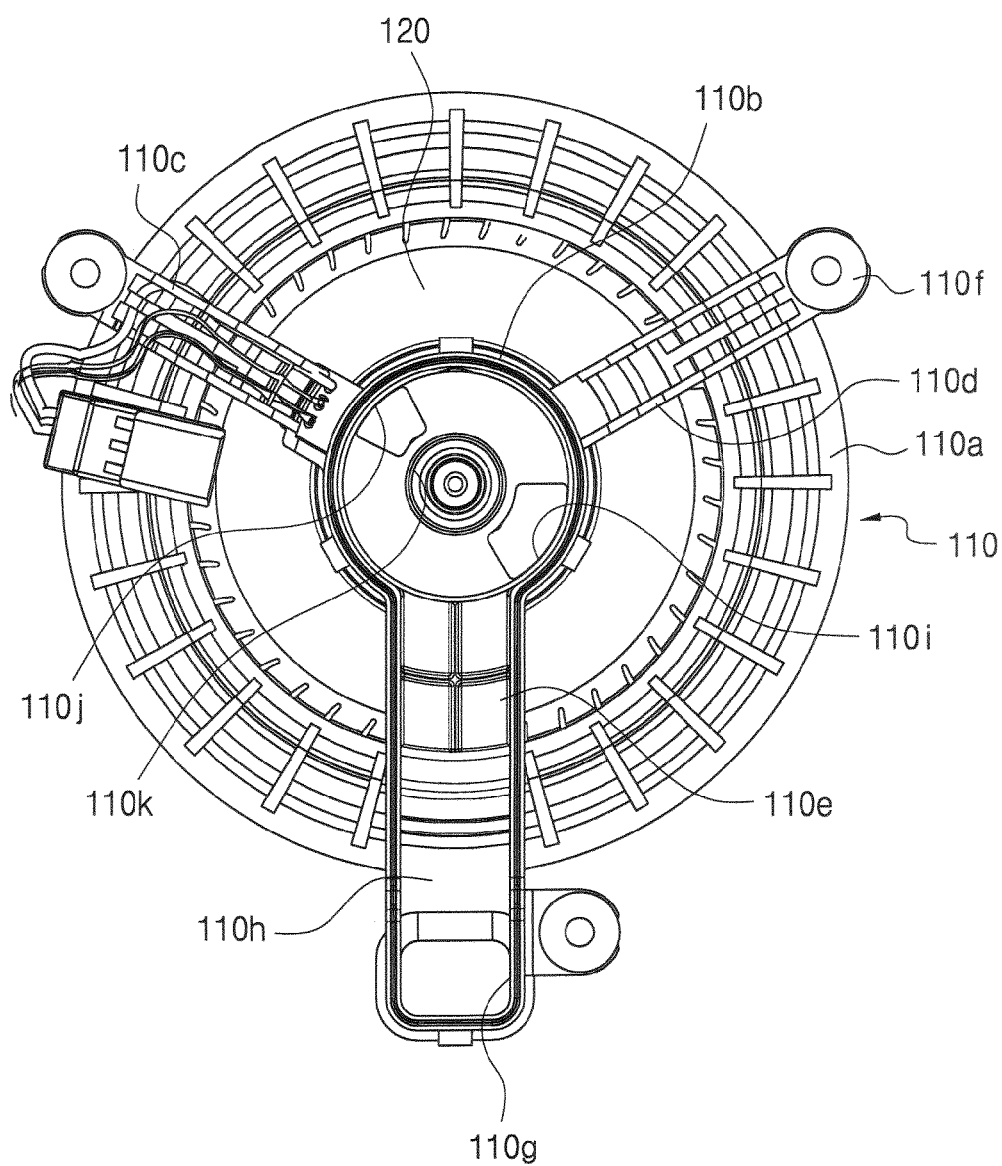
FIGS. 15C and 15D are a rear view and a side view showing a roof fan of which the cover is removed, respectively.
Figure 15D:
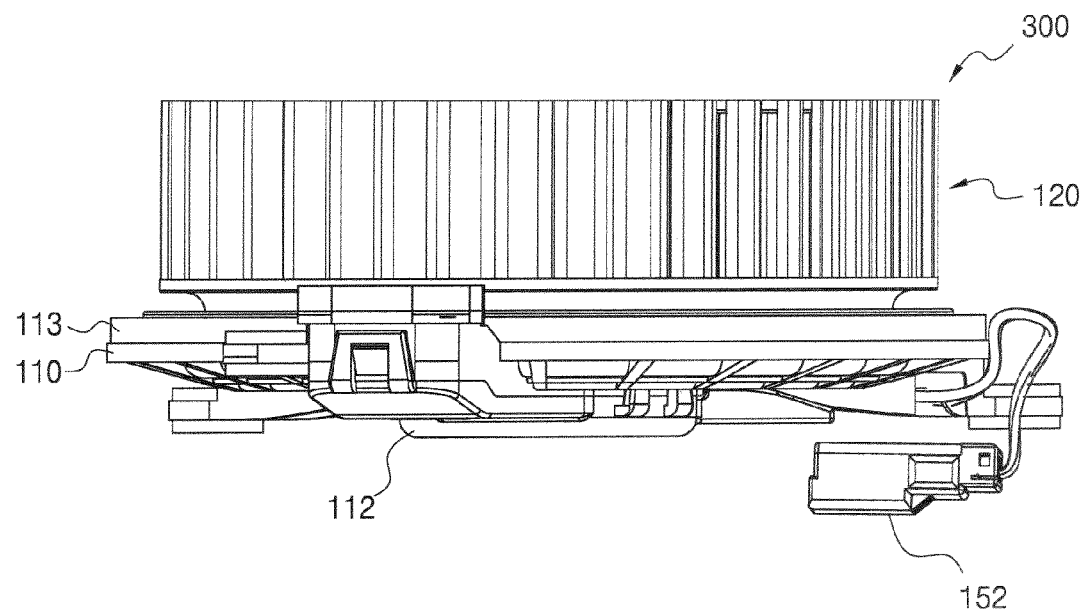
Figure 16:
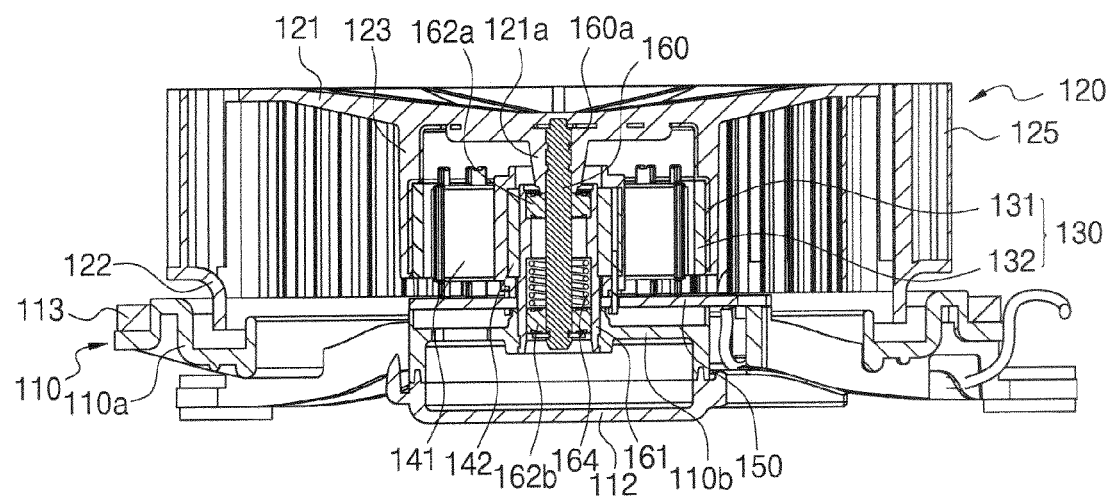
FIG. 16 is a cross-sectional view taken along an axial direction of the roof fan illustrated in FIG. 15A.
Figure 17:
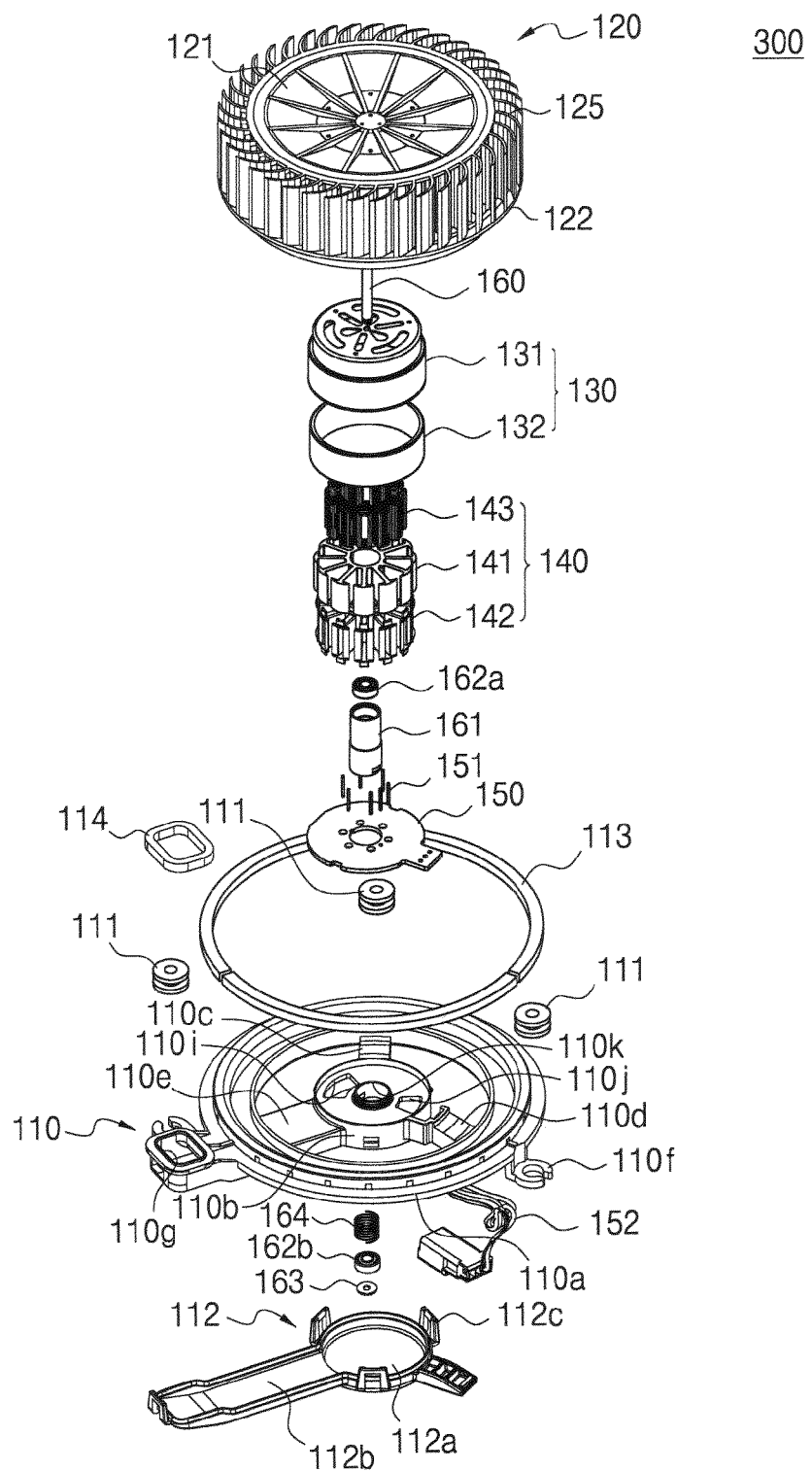
FIG. 17 is an exploded perspective view illustrating a roof fan using a radial gap type motor according to the present invention.
Figure 18A:
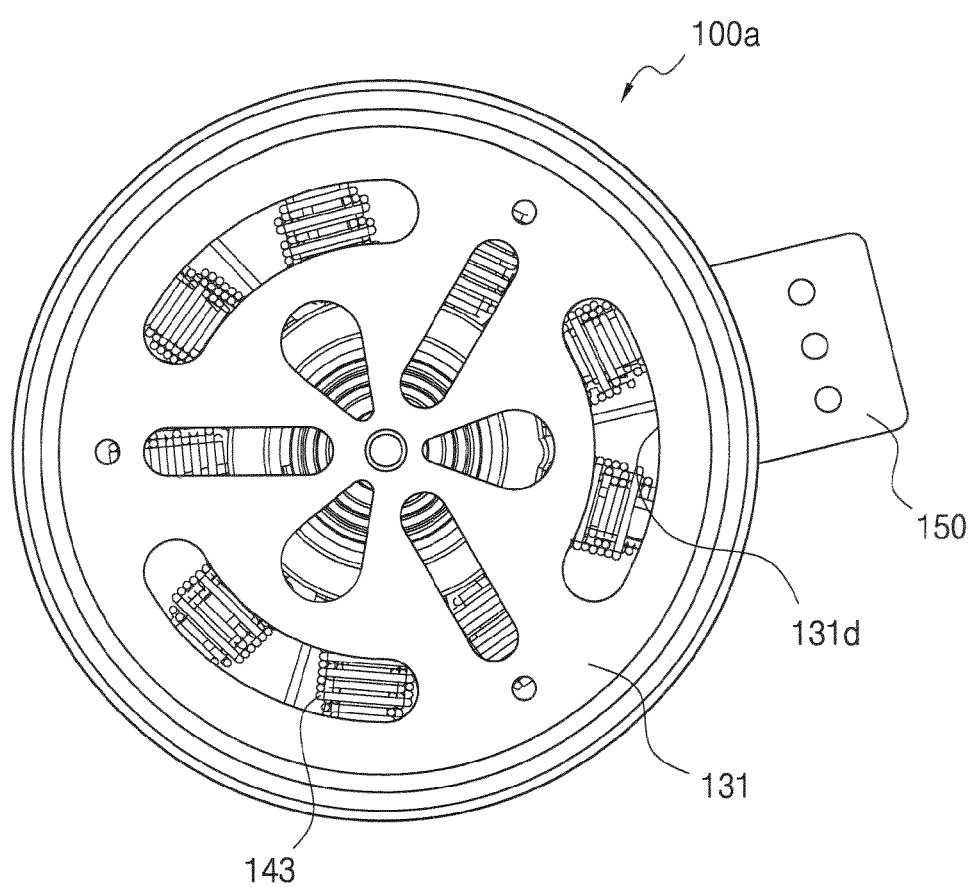
FIGS. 18A and 18B are a plan view and a side view of a radial gap type motor employed in a roof fan according to the present invention, respectively.
Figure 18B:
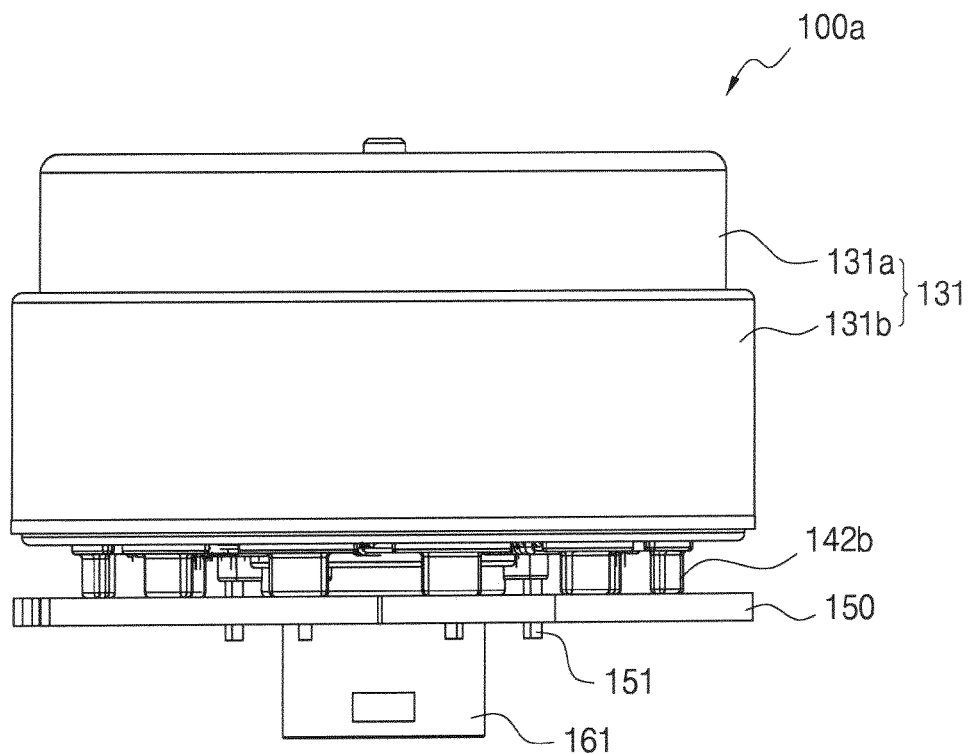

FIGS. 15A and 15B are a plan view and a rear view showing a roof fan using a radial gap type motor according to the present invention, respectively, and FIGS. 15C and 15D are a rear view and a side view showing a roof fan of which the cover is removed, respectively. FIG. 16 is a cross-sectional view taken along an axial direction of the roof fan illustrated in FIG. 15A, and FIG. 17 is an exploded perspective view illustrating a roof fan using a radial gap type motor according to the present invention.

Referring to FIGS. 15A through 17, the roof fan 300 for a vehicle according to the present invention includes a housing 110, a cover 112, a radial gap type motor 100a, and an impeller 120.

The vehicle roof fan discharges the generated wind directly downward and supplies it indiscriminately directly to users (or passengers) located nearby. Some users (or passengers) may dislike or avoid these direct strong fan winds.

The vehicle roof fan 300 may be installed on the ceiling of a vehicle in which an air conditioner is not installed to supply wind generated by the impeller or the fan not directly downward but to circulate indoor air of the vehicle to cool the passenger in summer.

The roof fan 300 for a vehicle according to the present invention is mounted on a roof fan installation module (not shown) attached on the ceiling of the vehicle.

The housing 110 includes: a ring-shaped outer frame 110a receiving a lower end of the impeller 120; a circular motor support portion 110b supporting the motor 100a by being coupled to a lower portion of the motor 100a; and three bridges 110c-110e to connect the outer frame 110a and the motor support portion 110b.

A vibration absorbing pad 113 is installed on the flange of the ring-shaped outer frame 110a, and the vibration absorbing pad 113 is arranged between the housing 110 and a roof fan installation module (not shown), to prevent vibration of the impeller 300 or the motor 100a from being transferred to the roof fan installation module.

In this case, each of the three bridges 110c-110e has a circular protrusion 110f extending for installing the roof fan 300 in the loop fan installation module, wherein a through-hole for fastening a fixing screw or a fixing bolt is formed at the center of the circular protrusion 110f In this case, when the fixing screw or the fixing bolt is fastened to the through-hole, the fixing screw or the fixing bolt is prevented from being loosened by interposing a rubber bush 111, and it is possible to prevent vibration generated when the impeller 300 is rotated from being transferred to the roof fan installation module through the fixing screw or the fixing bolt.

One of the three bridges 110c-110e may have a width wider than the other two bridges 110c and 110d, and may form an air-cooling flow passage portion 110h together with a cover 112 coupled thereto.

The cover 112 includes: a circular central portion 112a surrounding the motor support portion 110b while forming a space therein; and a flow passage forming portion 112b extending from the central portion 112a to surround the bridge 110e of the housing 110 to form an air-cooling flow passage portion 110h together with the bridge 110e, and a plurality of snap-coupling protrusions 112c protrude from the outer periphery of the circular central portion 112a to perform snap-coupling fixing to the motor support portion 110b in a snap-coupling method.

In addition, a through-hole 110g serving as an inlet of the air-cooling flow passage portion 110h is formed at the front end portion of the bridge 110e, and the motor support portion 110b includes at least one through-hole 110i and 110j serving as an outlet of the air-cooling flow passage portion 110h.

The motor support portion 110b has a through-hole 110k formed at the center of the motor support portion 100b, in which the lower portion of the motor 100a, that is, the bearing bush 161, is coupled to the through-hole 110k, and a printed circuit board (PCB) 150 where a motor driving circuit controlling driving of the motor 100a is mounted is arranged at a portion facing the motor support portion 110b.

An integrated circuit (IC) constituting a motor driving circuit and a heating electronic component, such as a transistor, are mounted on the printed circuit board (PCB) 150.

As will be described later, when the impeller 120 is operated by the motor 100a, air around the printed circuit board (PCB) 150 is supplied to the impeller 120 to generate negative pressure. Accordingly, negative pressure is also generated in the motor support portion 110b and the air-cooling flow passage portion 110h arranged to face the printed circuit board (PCB) 150, and thus, air sucked into the through-hole 110g at the front end portion of the bridge 110e passes through the air-cooling flow passage portion part 110h, and then air-cooling wind is discharged to the heating electronic component mounted on the printed circuit board (PCB) 150 through the through-holes 110i and 110j formed in the motor support portion 110b, to accordingly accomplish air-cooling.

The impeller 120 includes: a circular upper plate 121; a plurality of wings 125 radially extending from the outer periphery of the bottom surface of the circular upper plate 121; an annular lower plate 122 connecting and supporting a lower portion of the plurality of wings 125; a cylindrical support portion 123 extending in a cylindrical shape inside the bottom surface of the circular upper plate 121, and having a lower end portion surrounding a side surface of the back yoke 131 of the rotor 130 to be described later; and a shaft support portion 121a surrounding an upper portion of the rotary shaft 160 of the rotor 130 and the upper plate portion 131c of the back yoke 131.

In this case, the rotary shaft 160 and the shaft support portion 121a of the rotor 130 may be integrally formed by insert molding in which the rotary shaft 60 is inserted when the shaft support portion 121a is formed. The rotary shaft 160 may preferably have a plurality of concave grooves 160a formed at an outer periphery in order to increase coupling force with the shaft support portion 121a.

Figure 20:
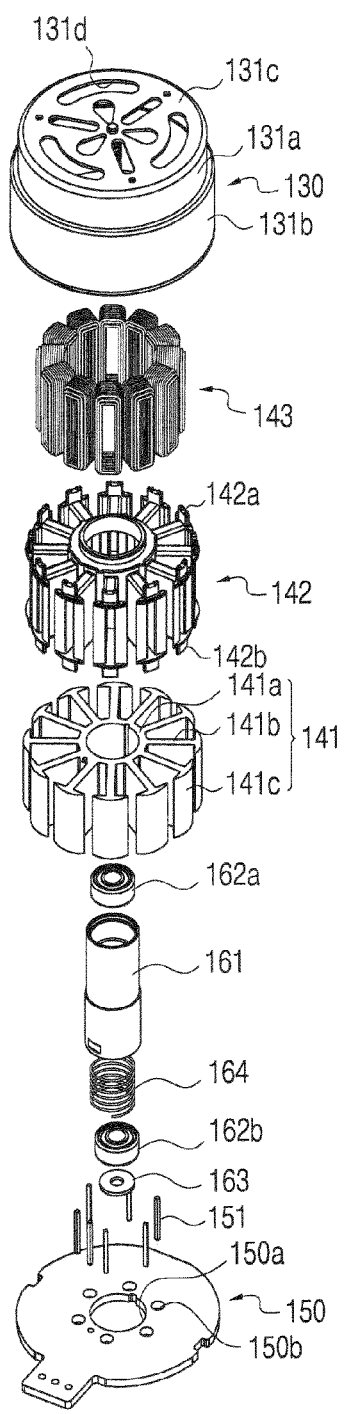
FIG. 20 is an exploded perspective view of a radial gap type motor according to the present invention.

As illustrated in FIG. 20, the back yoke 131 of the rotor 30 includes: a first cylindrical portion 131b in which the magnet 132 is attached to the inside of the first cylindrical portion 131b; a second cylindrical part 131a bent in two stages from the first cylindrical portion 131b and extending in a diameter smaller than that of the first cylindrical portion 131b, and an upper plate portion 131c bent at a right angle from an upper portion of the second cylindrical portion 131a and having a plurality of through-holes 131d formed therein.

In order to integrate the impeller 120 with the rotor 130, when the circular upper plate 121, the cylindrical support portion 123, and the shaft support portion 121a are formed, the back yoke 131 and the rotary shaft 160 are inserted, and a part of the upper plate 121 is formed on both side surfaces of the upper plate part 131c through a plurality of through-holes 131d provided in the upper plate portion 131c of the back yoke 131 to increase coupling force between the impeller 120 and the rotor 130.

As illustrated in FIGS. 16 to 20, the lower end of the motor 100a is supported to the motor support portion 110b of the housing 110 and the motor 100a rotating the impeller 120 includes a rotor 130 to the outer periphery of which the impeller 120 is coupled and a stator 140 that generates a rotating magnetic field for rotating the rotor 130 by being arranged in the inside of the rotor 130. As a result, the motor 100a forms a radial gap type outer rotor type motor.

The rotor 130 includes a back yoke 131 having an inverted cup shape and a magnet 132 attached to the inside of the back yoke 131.

The magnet 132 of the rotor 130 may be formed of a plurality of N-pole and S-pole split magnet segments, or may use a magnet in which the N-pole and S-pole are split and magnetized into multiple poles in a ring-shaped magnet, and the back yoke 31 is made of, for example, an electric steel sheet (S-60) and is installed on the rear surface of the magnet 132 to form a magnetic circuit.

As described above, the back yoke 131 has an inverted cup shape including the first cylindrical portion 131b, the second cylindrical portion 131a, and the upper plate portion 131c, and the magnet 132 is attached to an inner side of the first cylindrical portion 131b by using a bent portion between the first cylindrical portion 131b and the second cylindrical portion 131a.

In the stator 140, U, V, and W three-phase coils 143 are wound around the stator core 141. A motor driving circuit mounted on the printed circuit board (PCB) 150 to drive and control the motor 100a receives a rotor position signal from a Hall sensor (not shown) mounted on the printed circuit board (PCB) 150, and, in response to the received rotor position signal, alternately applies switching driving signals to the U, V, and W three-phase coils 143, to generate a rotating magnetic field for rotating the rotor 130.

The stator 140 includes an integral stator core 141 in which a plurality of teeth (i.e., the coil winding portion) 141b radially extend from a ring-shaped yoke (body) 141a, an insulating bobbin 142 formed, by assembly or insert molding, on an outer periphery of the stator core 141, and the three-phase (U, V, W) coils 143 wound on the outer periphery of the insulating bobbin 142.

In this case, the stator core 141 is formed by punching a plurality of thin electric steel sheets (T-60) (usually using silicon steel) and then stacking the plurality of thin electric steel sheets (T-60). As illustrated in FIG. 20, a plurality of teeth 141b of the stator core 141 formed by stacking a plurality of teeth 141b have a profile of a front end portion 141c, that is, a shoe portion, facing the magnet 132 of the rotor, the profile forming a round (R) shape, respectively.

As a result, the radial gap type motor 100a of this invention may obtain a back-EMF waveform in the form of a sine curve during operation, and may improve noise and vibration generation.

The bobbin 142 integrally formed on the outer periphery of the stator core 141 may be formed by an insert molding method using a thermosetting resin, for example, a bulk molding compound (BMC) molding material, such as polyester, or a thermoplastic resin.

Each of the plurality of teeth 141b is formed in a "T" shape. The insulating bobbin 142 is formed to surround the entire surface of the stator core 141 except for a front end portion facing the magnet 132 of the rotor. Portions surrounding the plurality of teeth 141b form coil winding regions in which the three-phase (U, V, W) coils 143 are wound.

The insulating bobbin 142 has upper and lower protrusions 142a and 142b integrally formed at upper and lower sides of the "T" shape front end portion, and serves to limit the coil winding regions in which the three-phase (U, V, W) coils 143 are wound. When the stator 140 and the printed circuit board (PCB) 150 are assembled, the lower protrusion 142b maintains a predetermined interval, and as a result, air-cooling between the stator 140 and the printed circuit board (PCB) 150 may be performed.

Figure 19A:
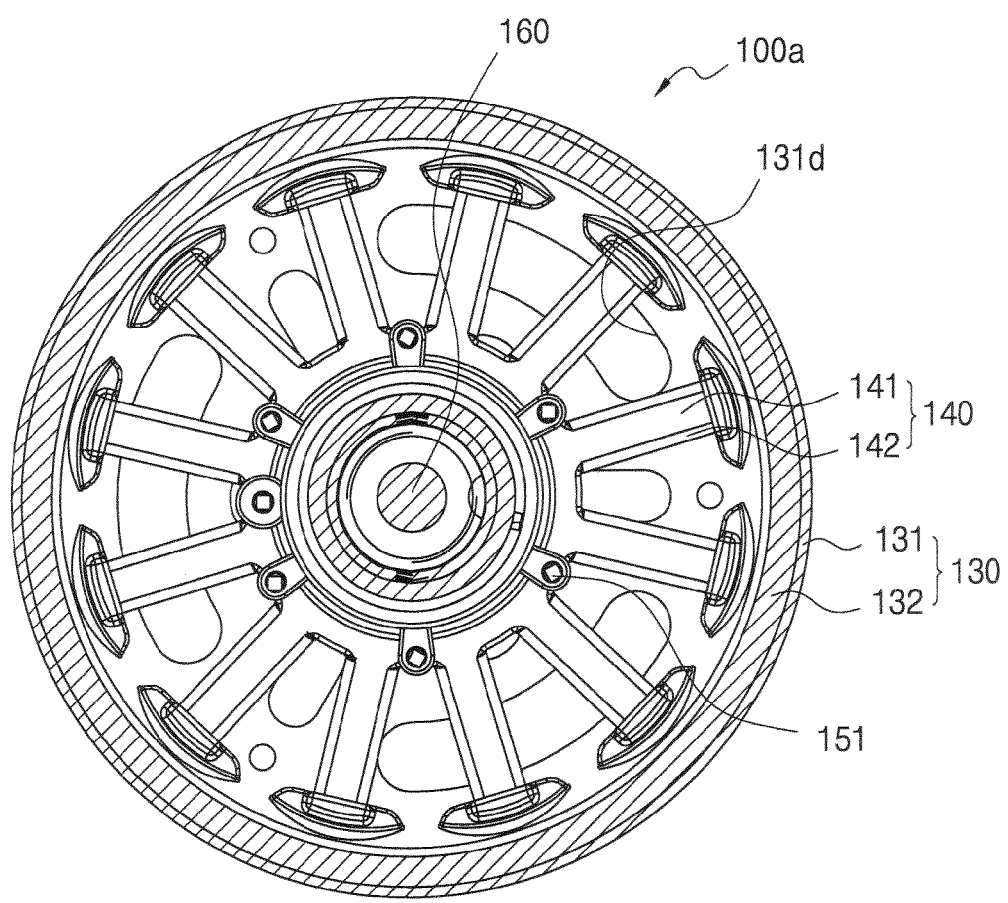
FIG. 19A and FIG. 19B are cross-sectional views of a radial gap type motor employed in a roof fan according to the present invention, respectively, cut along a diameter direction and an axial direction.
Figure 19B:
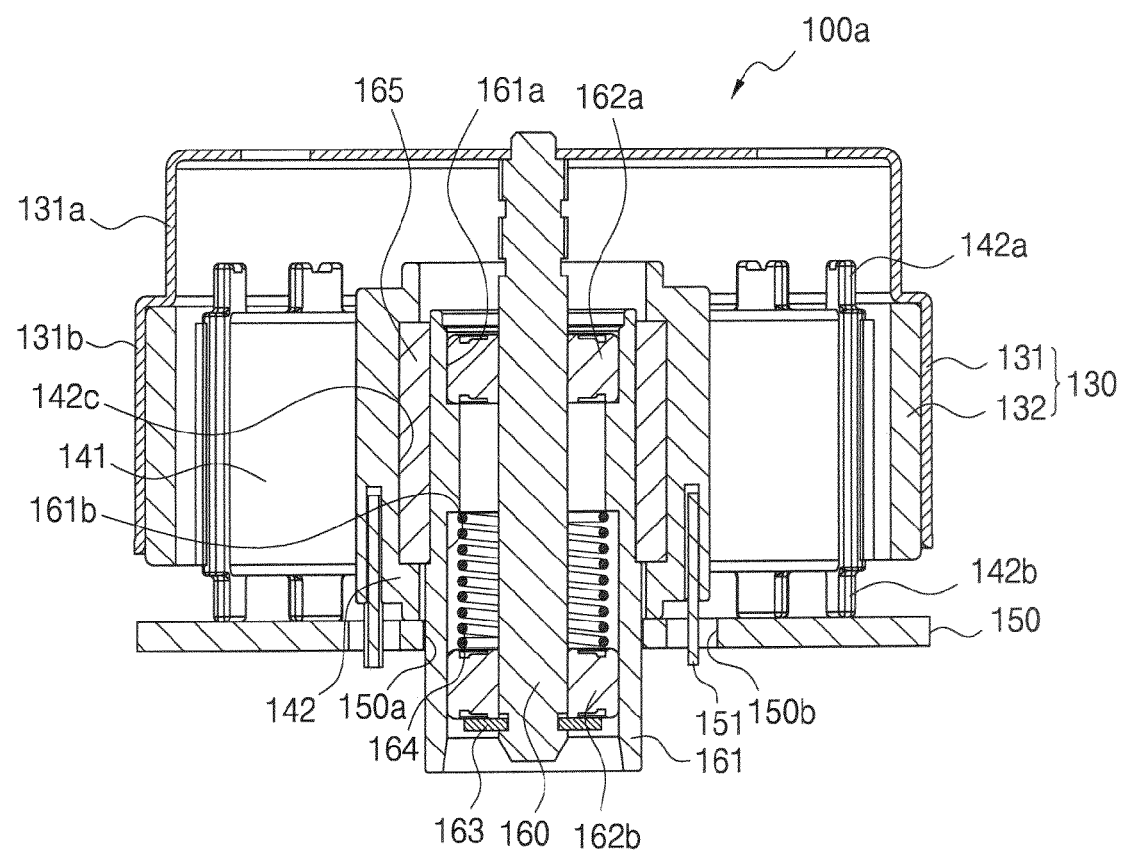

In addition, as shown in FIG. 19B, the insulating bobbin 142 may have six terminal pins 151, which are integrally formed in an insert molding method, and to which a start terminal and an end terminal of each of the three-phase (U, V, W) coils 143 are connected.

Moreover, as illustrated in FIG. 19B, the insulating bobbin 142c located inside the yoke (body) 141a has a concave groove 142c formed on the inner periphery thereof, and accordingly, a cylindrical insert 165 is inserted into the concave groove 142c to improve the verticality of the rotary shaft 160.

A cylindrical bearing bush 161 is inserted inside the cylindrical insert 165, and upper and lower bearings 162a and 162b for rotatably supporting the rotary shaft 160 are press-fitted to the upper and lower portions inside the cylindrical bearing bush 161.

In this case, sleeve bearings or ball bearings may be used as the upper and lower bearings 162a and 162b. Oil less bearings or oil bearings, such as carbon bearings or plastic bearings may be used when sleeve bearings are applied.

Stepped portions 161a and 161b are formed inside the upper and lower portions of the bearing bush 161, respectively, and the upper bearing 162a is installed in the upper stepped portion 161a. The lower bearing 162b is installed at the lower stepped portion 161b together with a spring 164, and a C-ring 163 for preventing separation of the lower bearing 162b is coupled to the rotary shaft 160 at the lower side of the lower bearing 162b. The spring 164 is used for the purpose of preventing noise and slip.

A lower part of the bearing bush 161 extends to a lower side of the printed circuit board (PCB) 150 through a central through-hole 150a formed at the center of the printed circuit board (PCB) 150, and is coupled to the through-hole 110K located in the center of the motor support portion 110b to support the motor 100a and impeller 120. That is, the motor 100a and the impeller 120 are stably supported by first inserting a lower portion of the bearing bush 161 into the central through-hole 150a of the printed circuit board (PCB) 150 and then coupling the lower portion to the through-hole 110k of the motor support portion 110b.

In the stator 140, three-phase (U, V, W) driving signals required for driving the motor are connected to the start terminals of the three-phase (U, V, W) coils 143 through three terminal pins 151 from a motor driving circuit (an inverter circuit) located at a lower side, and the end terminals of the three-phase (U, V, W) coils 143 reach the printed circuit board (PCB) 150 through the three terminal pins 151 and then are connected to each other using a conductive pattern to form a neutral point (NP) required for the Y-connection.

That is, one side (start terminal) of each phase of the three-phase (U, V, W) coils 143 is connected to the U, V, and W outputs of the inverter circuit constituting the motor driving circuit, and the other side (end terminal) of each phase is connected in a Y-connection manner in the printed circuit board (PCB) 150, and The three-phase (U, V, W) coils 143 and the motor operation circuit (inverter circuit) of the printed circuit board (PCB) 150 are electrically connected through six terminal pins 151. In addition, the six terminal pins 151 serve to stably support the motor 100a to the printed circuit board (PCB) 150 while being fixed to the printed circuit board (PCB) 150 by soldering after the lower end portion thereof passes through the through-hole 150b of the printed circuit board (PCB) 150.

Various electronic components forming the motor driving circuit (inverter circuit) are mounted on the lower side surface of the printed circuit board (PCB) 150, and the end terminals of the three-phase (U, V, W) coils 143 reach the printed circuit board (PCB) 150 through the three terminal pins 151 and then are connected to each other using a conductive pattern to form a neutral point (NP) required for the Y-connection. A connector 152 is connected to one side of the printed circuit board (PCB) 150 through a wiring harness.

As shown in FIG. 20, the stator core 141 may be implemented as an integrated stator core in which a plurality of or twelve teeth 141*b* each having a T-shaped leading end portion radially extend from the annular back yoke 141*a*, or may be implemented as a plurality of split cores each having a T-shaped leading end portion and a rear end portion interconnected to form an annular back yoke.

In this case, the motor 100*a* according to the present invention may be configured in a split-core manner in which three-phase (U, V, W) coils 143 are wound by using a plurality of split cores instead of the integral stator core 141, and then the stator supports 145 are simultaneously formed while being integrated into an annular shape using a molding resin.

In addition, the stator 140 according to the present invention may be formed by forming an insulating bobbin and a stator support on a plurality of teeth 141*b* in an assembly method and winding the three-phase (U, V, W) coils 143 thereon.

According to the present invention, the number of magnets (poles) and the number of teeth (slots) implementing the rotor 130 included in the single rotor type BLDC motor may have various combinations of the numbers of magnets and teeth in addition to 12 slots and 10 poles.

The motor 100*a* according to an embodiment of the present invention may include a BLDC motor including a 10-pole single rotor 130 and a single stator 140 having an 12-slot structure. In the stator 140, the three-phase (U, V, W) coils 143 are wound around the teeth 141*b* of the stator core 141. From the motor driving circuit installed on the printed circuit board (PCB) 150 to the three-phase (U, V, W) coils 143, driving signals are transmitted through six terminal pins 151 in a 6-step manner.

A conventional outer rotor type motor uses a stator core in which a plurality of teeth are radially arranged on the outer periphery of a back yoke. When the electric steel sheets (silicon steel sheets) of a thin plate are blanked and stacked with respect to the back yoke and the teeth portions, The core shape, particularly, the front end portion (i.e., the shoe portion) of the teeth facing the magnet of the rotor, is designed such that the outer shoe portion of the core forms a concentric circle with respect to the center.

Accordingly, in the conventional outer rotor type motor, a round (R) processing is not performed on the outer shoe portion of the stator core. As a result, as shown in FIG. 12A, in the conventional outer rotor type motor, a back electrostatic force (back-EMF) waveform is obtained in a square wave form, which causes noise and vibration when the motor is rotated.

When the radial gap type motor 100*a* according to the present invention is an outer rotor type motor, as illustrated in FIG. 20, forming of the stator core 141 by blanking and stacking the thin electric steel sheets (silicon steel sheets) is designed such that the front end portion 141*c* of each of the plurality of teeth 41*b*, that is, the profile of the shoe portion forms a round (R) shape.

In the present invention, as the round (R) shape is formed in the shape of the front end portion 141*c* of the teeth 141*b* of the stator core 141, that is, the shoe portion as described above, a back-electromagnetic force waveform (S1) close to an ideal sine curve (S2) may be obtained as shown in FIG. 12B (distortion: 0.5%). As a result, noise and vibration generation due to rotation of the motor may be improved, and core loss generated in the motor may be minimized.

In the roof fan 300 according to the present invention, when the driving signals are applied to the three-phase (U, V, W) coils 143 through six terminal pins 151 from the motor driving circuit installed on the printed circuit board (PCB) 150, a rotating magnetic field is generated from the stator 140 having the three-phase (U, V, W) coils 143 wound thereon, thereby rotating the rotor 130.

As the rotor 130 rotates, the impeller 120 integrally coupled to the back yoke 131 of the rotor 130 also rotates.

When the impeller 120 is rotated as described above, indoor air is sucked through the space between the three bridges 110*c*-110*e* of the housing 110 and then radiated to the side of the impeller 120 and discharged to the indoor upper space of the vehicle through a duct provided in a roof fan installation module (not shown).

That is, the wind generated by the impeller 120 may not be discharged directly downward but supplied to the side surface to circulate indoor air of the vehicle, thereby indirectly cooling the heat of the passenger.

In addition, in the present invention, negative pressure is generated in the air-cooling flow passage 110*h* formed by one bridge 110*e* and the cover 112 during operation of the impeller 120. Accordingly, the air current introduced into the air-cooling flow passage 110*h* is discharged through the through-holes 110*i* and 110*j* formed in the motor support portion 110*b*, and the discharged air-cooling wind cools the heating electronic component mounted on the printed circuit board 150. Accordingly, it is possible to prevent malfunction of the motor 100*a* and increase efficiency.

INDUSTRIAL APPLICABILITY

The present invention relates to an axial gap type motor employing a non-rare earth magnet, and particularly, may be applied to a longitudinal-axis type permanent magnet synchronous motor. The motor may be applied to a hybrid vehicle, an electric vehicle, and a fuel cell vehicle, and thus may be applied to an electric water pump (EWP) for a cooling device that circulates cooling water for cooling an electric component, a battery, a fuel cell stack, and the like, a compressor, an oil pump, etc.

What is claimed is:

1. An axial gap type motor for an electric water pump (EWP) with an impeller consisting of:
    a rotor rotatably supported inside a fluid flow passage between a pump cover and a body case, the impeller being disposed inside the fluid flow passage, the body case having a cylindrical portion and a partition; and
    a stator arranged in a lower space formed by the body case and an upper cover, and generating a rotating magnetic field to rotatably drive the rotor,
    wherein the rotor is integrally formed on a lower side of the impeller and rotatably supported by a support shaft having one end supported on the partition, the rotor is formed of a ring-shaped back yoke and a magnet installed on a bottom surface of the ring-shaped back yoke, and the magnet is configured to be in contact with a fluid flowing the fluid flow passage,
    wherein the partition is arranged on top of the body case to separate between the rotor and the stator, and
    wherein the partition is integrally formed with the body case and has a thickness smaller than that of the cylindrical portion of the body case.

2. The axial gap type motor of claim 1, wherein
the stator comprises a stator core including: a plurality of teeth each of which is formed in a T-shape and on which a coil is wound; and a back yoke connected to the plurality of teeth at a right angle to form a magnetic circuit, and
each of the plurality of teeth is made of soft magnetic composites (SMC) powder, and the back yoke is made of an electric steel sheet.

3. The axial gap type motor of claim 1, wherein
the stator comprises a stator core on which a stator coil is wound, wherein
the stator core comprises:
a plurality of teeth annularly arranged on the same circumference in parallel to an axial direction so that each front end portion is placed to face a magnet of the rotor; and
a back yoke which is connected at right angles to the plurality of teeth and made of an annular disk to form a magnetic circuit.

4. The axial gap type motor of claim 3, wherein each of the plurality of teeth is made of soft magnetic composites (SMC) powder, and the back yoke is made of a plurality of stacked electric steel sheets.

5. The axial gap type motor of claim 3, wherein
each of the plurality of teeth comprises:
a coil winding portion on which the coil is wound; and
a shoe having a flange extending from the coil winding portion, wherein
an edge between a side surface and a front end surface of the shoe and the front end surface of the shoe are round (R) processed.

6. The axial gap type motor of claim 5, wherein the coil winding portion is formed of a triangular pillar, and the shoe has a trapezoidal cross section.

7. The axial gap type motor of claim 3, wherein
the back yoke comprises a plurality of assembly holes or assembly recesses, and
the plurality of teeth have one end portions which are press-fitted and coupled to assembly holes or assembly recesses of the back yoke, respectively.

8. The axial gap type motor of claim 1, further comprising
a driver including a printed circuit board (PCB) on which a motor driving circuit is formed to drive the stator, wherein
a land portion of the PCB is electrically interconnected with a bottom surface of a back yoke.

9. The axial gap type motor of claim 1, further comprising:
a sleeve bearing coupled to an outer periphery of the support shaft to rotatably support the rotor; and
a bearing housing integrally formed on the lower plate of the impeller and accommodating the sleeve bearing therein.

* * * * *